(12) United States Patent
Morisawa et al.

(10) Patent No.: US 11,084,673 B2
(45) Date of Patent: Aug. 10, 2021

(54) MEDIA SUPPLYING APPARATUS AND RECORDING APPARATUS

(71) Applicant: SEIKO EPSON CORPORATION, Tokyo (JP)

(72) Inventors: Ryoichi Morisawa, Shiojiri (JP); Takashi Matsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/081,359

(22) Filed: Oct. 27, 2020

(65) Prior Publication Data

US 2021/0122592 A1 Apr. 29, 2021

(30) Foreign Application Priority Data

Oct. 28, 2019 (JP) .............................. JP2019-195445

(51) Int. Cl.
*B65H 1/04* (2006.01)
*H04N 1/00* (2006.01)

(52) U.S. Cl.
CPC ........... *B65H 1/04* (2013.01); *H04N 1/00588* (2013.01); *H04N 1/00814* (2013.01)

(58) Field of Classification Search
CPC ............... B65H 1/04; B65H 2511/152; B65H 2511/20; B65H 2220/01; B65H 2220/02; B65H 2220/11; B65H 2301/4212; B65H 2301/5144; B65H 2301/517; B65H 23/1888; B65H 2402/31; B65H 2405/11151; B65H 2553/612; B65H 2601/273; B65H 2801/15; B65H 2801/27; B65H 29/246; B65H 29/247; B65H 31/02; B65H 43/06; B65H 19/105; B65H 20/02; B65H 2301/22; B65H 2301/44318; B65H 2301/4493; B65H 2301/522;
(Continued)

(56) References Cited

U.S. PATENT DOCUMENTS 7,600,745 B2 * 10/2009 Asada .................. B65H 3/0684
271/9.08
8,002,269 B2 * 8/2011 Asada ...................... B65H 1/04
271/145
(Continued)

FOREIGN PATENT DOCUMENTS

JP 2001-253612 A 9/2001
JP 2018-177381 A 11/2018

*Primary Examiner* — Negussie Worku
(74) *Attorney, Agent, or Firm* — Workman Nydegger

(57) ABSTRACT

A media supplying apparatus includes a first support portion, a second support portion, a housing portion, and a holding portion. The first support portion has a first supporting surface for supporting a paper sheet, is inclinably provided, and when inclined from a non-use state, switches to a use state. The second support portion has a second supporting surface that supports the paper sheet, and is disposed upstream of the first support portion in the use state in a supply direction of the paper sheet. The housing portion is, inclinably toward an upstream of the first supporting portion in the supply direction, provided, and retractably houses the second support portion. The holding portion holds the first support portion and the housing portion in an inclination orientation so that the first supporting surface and the second supporting surface are aligned in the supply direction.

9 Claims, 18 Drawing Sheets

(58) Field of Classification Search
CPC ............... B65H 23/044; B65H 23/245; B65H 2403/55; B65H 2404/143; B65H 2404/256; B65H 2404/28; B65H 2404/5331; B65H 2406/351; B65H 2406/362; B65H 2406/3622; B65H 2406/363; B65H 2511/52; B65H 2515/314; B65H 2515/32; B65H 2515/702; B65H 2515/842; B65H 2553/20; B65H 2701/1311; B65H 2701/1313; B65H 2801/06; B65H 2801/12; B65H 2801/21; B65H 29/20; B65H 35/0006; B65H 35/08; B65H 3/06; B65H 3/0607; B65H 3/5261; B65H 5/021; B65H 5/06; B65H 5/062; B65H 5/224; B65H 7/02; B65H 7/06; B65H 9/004; B65H 9/006; H04N 1/00588; H04N 1/00814
USPC ........................................................ 358/498
See application file for complete search history.

(56) References Cited

U.S. PATENT DOCUMENTS

| | | | | |
|---|---|---|---|---|
| 8,424,868 B2 * | 4/2013 | Asada | ...................... | B65H 1/04 |
| | | | | 271/145 |
| 2006/0164501 A1 * | 7/2006 | Koga | ..................... | B41J 13/103 |
| | | | | 347/153 |
| 2007/0170641 A1 * | 7/2007 | Asada | ..................... | B65H 1/266 |
| | | | | 271/145 |
| 2013/0161893 A1 * | 6/2013 | Ro | ......................... | B65H 1/266 |
| | | | | 271/9.01 |
| 2013/0182273 A1 * | 7/2013 | Lee | ...................... | H04N 1/1235 |
| | | | | 358/1.13 |
| 2014/0027969 A1 * | 1/2014 | Kondo | .................... | B65H 1/26 |
| | | | | 271/9.02 |
| 2014/0200562 A1 * | 7/2014 | Rathjen | ................... | A61F 9/008 |
| | | | | 606/4 |
| 2018/0282083 A1 * | 10/2018 | Kanemaru | ........... | B65H 3/0661 |

* cited by examiner

US 11,084,673 B2

MEDIA SUPPLYING APPARATUS AND RECORDING APPARATUS

The present application is based on, and claims priority from JP Application Serial Number 2019-195445, filed Oct. 28, 2019, the disclosure of which is hereby incorporated by reference herein in its entirety.

BACKGROUND

1. Technical Field

The present disclosure relates to a media supplying apparatus that supplies media and a recording apparatus that includes the media supplying apparatus.

2. Related Art

To date, there is a known media supplying apparatus having a paper feed tray that determines the orientation of a sheet to be supplied, and an example thereof is disclosed in JP-A-2001-253612. The paper feed tray described in JP-A-2001-253612 is provided at a paper feed port in a rear portion of a casing.

There is a media feeding apparatus having a medium orientation determining member that is fixed to an apparatus main body and that determines an inclination orientation of a medium, and a medium supporting member that is provided continuous with the medium orientation determining member and that, in a deployed state, supports the medium.

In this media supplying apparatus, since the medium orientation determining member is fixed in an inclined state, the space required for the apparatus main body is increased by the size of the medium orientation determining member. That is, it may be difficult to reduce the size of the media supplying apparatus.

SUMMARY

According to an aspect of the present disclosure, a media supplying apparatus includes a first supporting portion that has a first supporting surface for supporting a medium, that is inclinably provided on an apparatus main body for supplying the medium, and that, when inclined from a non-use state, switches to a use state in which the first supporting surface supports the medium, a second supporting portion that has a second supporting surface for supporting the medium, and that is disposed upstream of the first supporting portion in the use state in a supply direction of the medium; a housing portion that is, inclinably toward an upstream of the first supporting portion in the supply direction, provided in the apparatus main body, and that retractably houses the second supporting portion, and a holding portion that holds the first supporting portion and the housing portion in an inclination orientation so that the first supporting surface and the second supporting surface are aligned in the supply direction.

DESCRIPTION OF EXEMPLARY EMBODIMENTS

Figure 1:
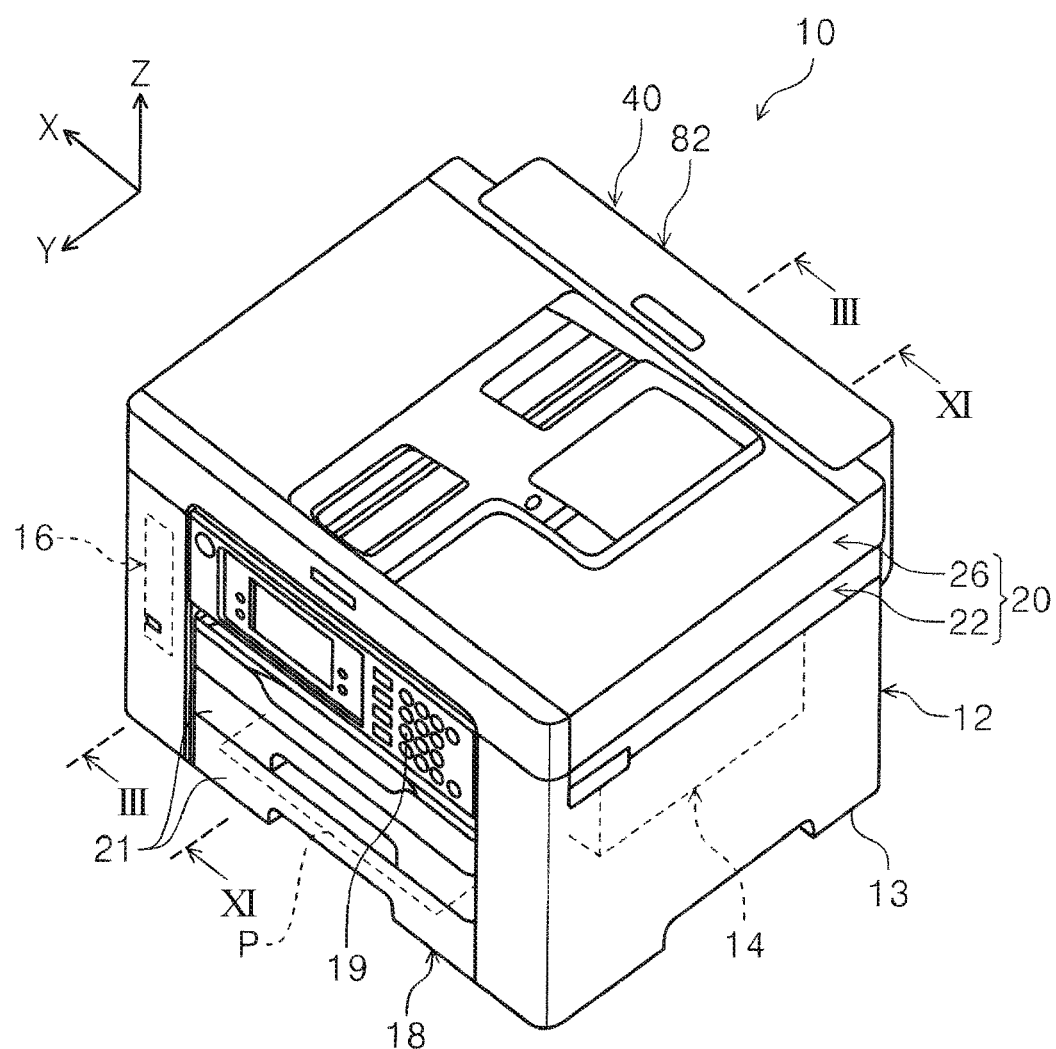
FIG. 1 is a perspective view of a printer according to an embodiment when viewed obliquely from the front.

Hereinafter, the present disclosure will be schematically described.

According to a first aspect of the present disclosure, a media supplying apparatus includes a first supporting portion that has a first supporting surface for supporting a medium, that is inclinably provided on an apparatus main body for supplying the medium, and that, when inclined from a non-use state, switches to a use state in which the first supporting surface supports the medium, a second supporting portion that has a second supporting surface for supporting the medium, and that is disposed upstream of the first supporting portion in the use state in a supply direction of the medium; a housing portion that is, inclinably toward an upstream of the first supporting portion in the supply direction, provided in the apparatus main body, and that retractably houses the second supporting portion, and a holding portion that holds the first supporting portion and the housing portion in an inclination orientation so that the first supporting surface and the second supporting surface are aligned in the supply direction.

According to this aspect, when the first supporting portion is inclined from the orientation for the non-use state, the first supporting portion is switched to the use state in which the first supporting surface supports the medium.

The housing portion is inclined toward the upstream of the first supporting portion in the supply direction. Then, the second supporting portion is pulled out from the housing portion, and is disposed upstream of the first supporting portion in the supply direction of the medium.

The holding portion holds the first supporting portion and the second supporting portion in an inclination orientation so that the first supporting surface and the second supporting surface are aligned in the supply direction.

Here, when the first supporting portion and the housing portion are not used, the storage space required in one direction of the apparatus main body is smaller than when the first supporting portion and the housing portion are in the inclination state. That is, the media supplying apparatus can be reduced in size as compared with a configuration in which the first supporting portion is fixed in an inclination state.

In a second aspect according to the first aspect, the holding portion includes a contact portion that is provided on the apparatus main body and that comes into contact with the first supporting portion in the use state and an interlocking portion that is provided in the first supporting portion and the housing portion and that interlocks inclination of the first supporting portion with inclination of the housing portion.

According to this aspect, when the first supporting portion is inclined, the second supporting portion is also inclined by the interlocking portion. Here, the first supporting portion comes into contact with the contact portion, whereby the inclination state of the first supporting portion is held and the inclination state of the housing portion is held. The second supporting portion is pulled out from the housing portion, and the first supporting surface and the second supporting surface are in a line in the supply direction.

Thus, since the first supporting portion and the housing portion are interlocked by the interlocking portion, the first supporting portion and the housing portion can be held in an inclination state by performing only one step of inclining the first supporting portion and bringing the first supporting portion into contact with the contact portion. That is, the work of holding the first supporting portion and the housing portion in an inclination state can be easily performed.

In a third aspect according to the second aspect, the interlocking portion includes a groove portion that is formed on one of the first supporting portion and the housing portion, and an insertion portion that is formed on an other of the first supporting portion and the housing portion and that is inserted into the groove portion.

According to this aspect, when the inclination angle of the first supporting portion changes, the contact position of the insertion portion and the groove portion changes, and the inclination angle of the housing portion changes. In this way, since it is only necessary to bring the groove portion and the insertion portion into contact with each other, the first supporting portion and the housing portion can be interlocked with a simple configuration.

In a fourth aspect according to the second or third aspect, the contact portion and the interlocking portion are disposed at the same position in a width direction intersecting the supply direction.

According to this aspect, the contact portion and the interlocking portion are disposed at the same position in the width direction. That is, the contact portion and the interlocking portion are close to each other. Here, when the load of the medium acts on the first supporting portion, since the interlocking portion is located closer to the contact portion of the apparatus main body, the load can be more easily received by the apparatus main body than in a configuration in which the interlocking portion is located away from the contact portion. In other words, since the load is less likely to act on the interlocking portion, it is possible to suppress deformation of the interlocking portion when the medium is placed on the first supporting portion.

In a fifth aspect according to any one of the first to fourth aspects, the media supplying apparatus further includes an opening/closing member that is openably/closably provided on the apparatus main body, that covers the first supporting portion, the second supporting portion, and the housing portion when in a closed state, and that inclines and exposes the first supporting portion and the housing portion when transitioning from the closed state to an open state.

According to this aspect, when the opening/closing member is in the closed state, since the first supporting portion, the second supporting portion, and the housing portion are covered with the opening/closing member, the first supporting portion, the second supporting portion, and the housing portion are less likely to get dirty. In addition, when the opening/closing member is moved to the open state, since the opening/closing member inclines and exposes the first supporting portion and the housing portion, it is not necessary to separately perform the opening operation of the opening/closing member and the inclination operation of the first supporting portion and the housing portion. In this way, it is possible to suppress the first supporting portion, the second supporting portion, and the housing portion from being contaminated, and further, it is possible to reduce the operations required for operating the medium supply apparatus.

In a sixth aspect according to the fifth aspect, the opening/closing member is inclinably provided on the apparatus main body, and a third height position of a fulcrum of inclination of the opening/closing member in a height direction intersecting the supply direction of the apparatus main body is located between a first height position of a fulcrum of inclination of the first supporting portion and a second height position of a fulcrum of inclination of the housing portion.

A bottom surface of the apparatus is used as a reference surface. In order for the opening/closing member to expose the first supporting portion and the housing portion, the inclination angle of the opening/closing member with respect to the reference surface needs to be smaller than the inclination angle of the first supporting portion with respect to the reference surface or the inclination angle of the housing portion with respect to the reference surface.

Here, according to this aspect, the third height position of the fulcrum of inclination of the opening/closing member is located between the first height position of the fulcrum of inclination of the first supporting portion and the second height position of the fulcrum of inclination of the housing portion. As a result, because the height required for the opening/closing member is lower and the inclination range of the opening/closing member is smaller than in the configuration in which the third height position is closest to the reference surface, the space required for opening the opening/closing member can be reduced.

In a seventh aspect according to the fifth or sixth aspect, the opening/closing member, in an inclined state, supports the second supporting portion in the use state.

According to this aspect, since the second supporting portion is supported by the housing portion and the opening/closing member, as compared with a configuration in which the second supporting portion is supported only by the housing portion, it is possible to suppress deformation of the second supporting portion when the medium is placed thereon.

In an eighth aspect according to any one of the fifth to seventh aspects, a recording apparatus includes the media supplying apparatus, a reading portion that is openably/closably provided on a recording apparatus main body, that reads information provided on the medium when in a closed state, and that, in an open state, comes into contact with the opening/closing member and puts the opening/closing member in the open state, and a recording portion that records, based on received information, on the medium, information.

According to this aspect, it is possible to obtain the same effects as those of the media supplying apparatus according to any one of the fifth to seventh aspects.

In a ninth aspect according to any one of the first to seventh aspects, a recording apparatus includes the media supplying apparatus and a recording portion that records, based on received information, on the medium, information.

According to this aspect, it is possible to obtain the same effects as those of the media supplying apparatus according to any one of the first to seventh aspects.

An embodiment of a media supplying apparatus and a recording apparatus according to the present disclosure will be described in detail below with reference to the accompanying drawings. In an XYZ coordinate system illustrated in each drawing, in a printer 10 described later, the X-axis direction is an apparatus width direction, the Y-axis direction is an apparatus depth direction, and the Z-axis direction is an apparatus height direction.

Further, when distinguishing the left side from the right side when viewed from the front in the apparatus width direction, the left side is referred to as the +X side and the right side is referred to as the −X side. When distinguishing the front side from the rear side in the apparatus depth direction, the front side is referred to as the +Y side and the rear side is referred to as the −Y side. When distinguishing the upper side from the lower side in the apparatus height direction, the upper side is referred to as the +Z side and the lower side is referred to as the −Z side.

Printer Outline

FIG. 1 illustrates the printer 10 as an example of a recording apparatus. The printer 10 records various kinds of information on a paper sheet P as an example of a medium. The X-axis direction is an example of a width direction of the paper sheet P. Various information recorded on the paper sheet P includes character information and image information. In addition, the printer 10 also includes a main body portion 12, a cassette housing portion 18, an operation panel 19, a scanner portion 20, and a rear-surface-side paper feeding portion 40.

The main body portion 12 is configured as an example of a recording apparatus main body, and includes a casing 13, an image recording portion 14 provided inside the casing 13, a reversing unit 15 (FIG. 2), and a control portion 16. In addition, inside the casing 13, there is formed a transport path (not illustrated) through which the paper sheet P fed from the cassette housing portion 18 is reversed by the reversing unit 15 and transported to the +Y side. The paper sheet P is supplied along the transport path to the +Y side from the rear-surface-side paper feeding portion 40 (described later).

The image recording portion 14 is an example of a recording portion, and includes a head (not illustrated) and a portion of the control portion 16. The head is configured as a so-called ink-jet-type recording head that records various information on the paper sheet P by ejecting ink, which is an example of a liquid, onto the paper sheet P. In addition, the image recording portion 14 records the information on the paper sheet P based on the information of the document read by the scanner portion 20 described later or information received from outside of the printer 10.

The control portion 16 is configured to include a central processing unit (CPU), a read only memory (ROM), a random access memory (RAM), and a storage (not illustrated), and controls the transport of the paper sheet P in the printer 10 and the operation of recording various information on the paper sheet P. In addition, the control portion 16 can control various operations in the printer 10 based on information input from the operation panel 19. In the printer 10, the same operational effects as those of the rear-surface-side paper feeding portion 40 described later can be obtained.

The cassette housing portion 18 has a plurality of housing cassettes 21 that house the paper sheets P. The paper sheets P are sent to the above-described transport path by a pair of rollers (not illustrated).

Figure 2:
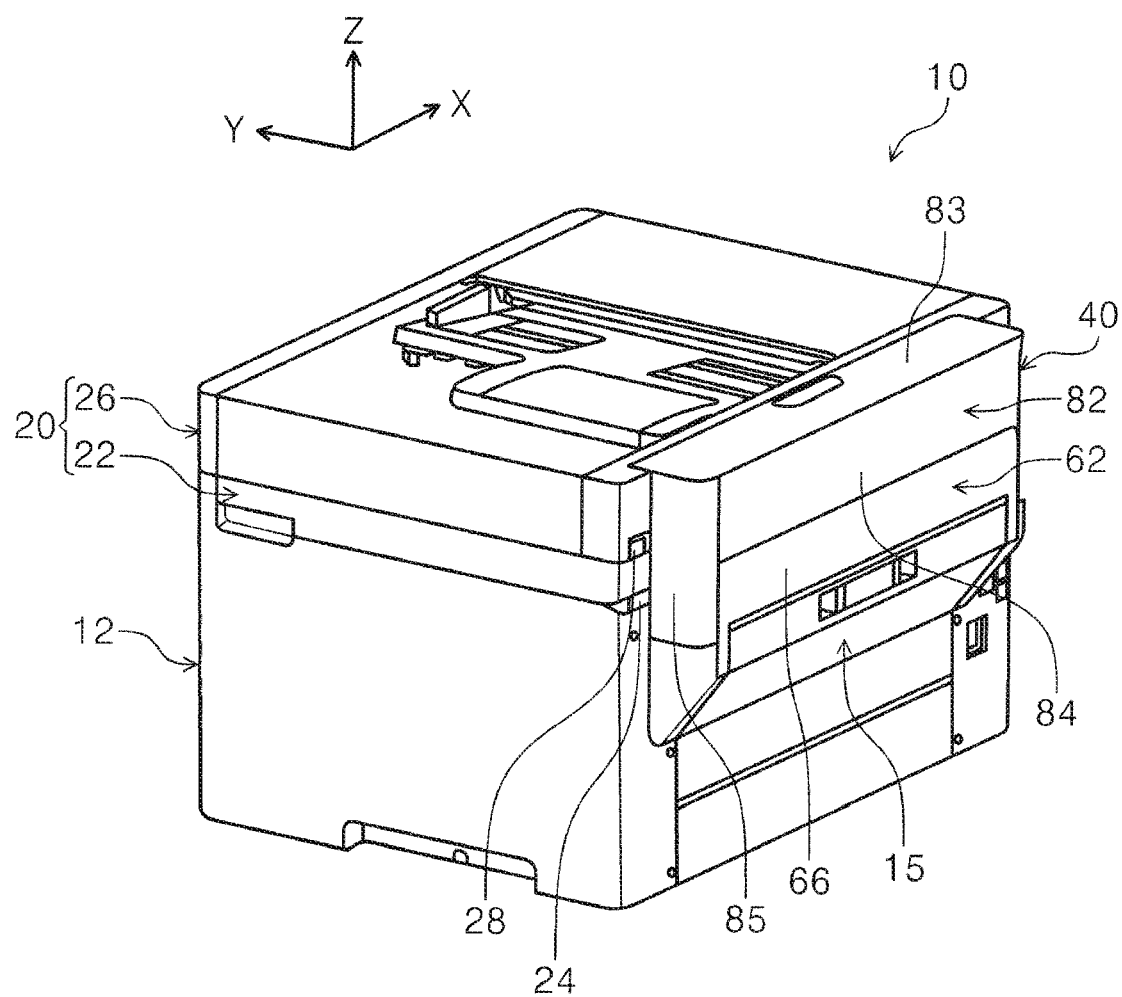
FIG. 2 is a perspective view of the printer according to the embodiment when viewed obliquely from the rear.

The scanner portion 20 illustrated in FIG. 2 is configured as an example of a reading portion, and reads information recorded on a document (not illustrated). The information of the document read by the scanner portion 20 is stored in the RAM or the storage of the control portion 16 (FIG. 1). In addition, the scanner portion 20 also includes a scanner unit 22 and an auto document feeder (ADF) unit 26. Further, a document is included as an example of a medium.

The scanner unit 22 is disposed on the +Z side of the main body portion 12. A −Y side end portion of the scanner unit 22 is coupled to a −Y side end portion of the main body portion 12 by a hinge portion 24. As a result, the scanner unit 22 opens and closes a +Z side opening portion of the main body portion 12. In addition, the scanner unit 22, through movement of a sensor (not illustrated) in the X-axis direction or when the movement of the sensor is stopped, reads the information of the document.

The ADF unit 26 is disposed on the +Z side of the scanner unit 22. The −Y side end portion of the ADF unit 26 is coupled to the −Y side end portion of the scanner unit 22 by a hinge portion 28. As a result, the ADF unit 26 exposes or covers the +Z side surface of the scanner unit 22. In addition, the ADF unit 26 sends a document onto the scanner unit 22.

Figure 3:
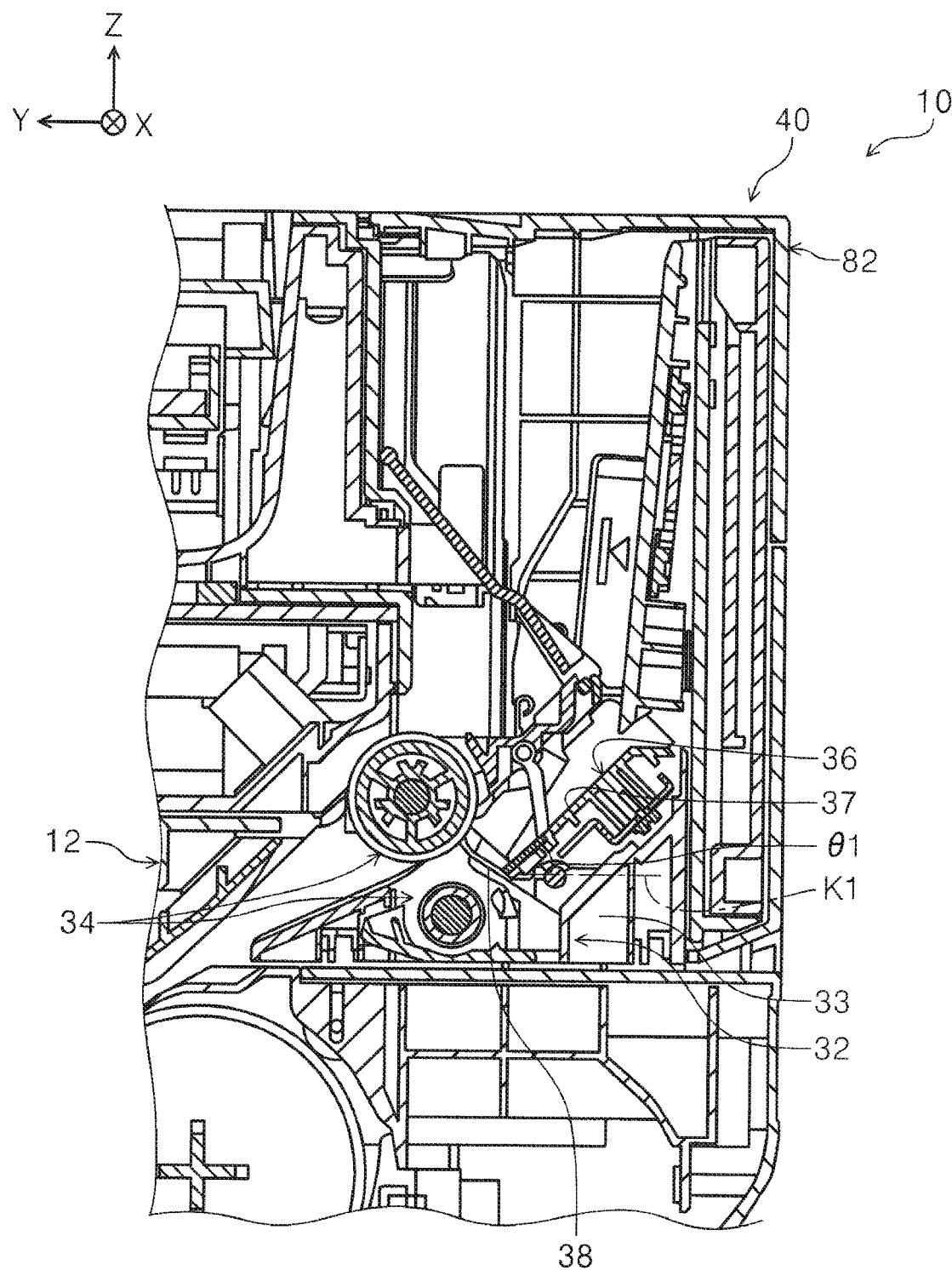
FIG. 3 is a side sectional view (a sectional view taken along line III-III in FIG. 1) illustrating an internal configuration of a rear-surface-side paper feeding portion according to the embodiment.

In FIG. 3, a portion on the −Y side and +Z side of the center of the main body portion 12 and the rear-surface-side paper feeding portion 40 are illustrated. The portion on the −Y side of the center of the main body portion 12 is configured to include, for example, a main body frame 32, a pair of feed rollers 34, and a main-body-side support member 36.

The main body frame 32 is an example of an apparatus main body, and is formed of a plurality of members including side plates 33 that stand upright along the YZ plane. Two side plates 33 are provided with an interval therebetween in the X-axis direction.

The pair of feed rollers 34 are provided so as to rotate with the X-axis direction as the axial direction, and are formed of two rollers disposed in the Z-axis direction. In addition, the pair of feed rollers 34 are configured to function as a portion of the rear-surface-side paper feeding portion 40, which will be described later, and feed the paper sheets P of the rear-surface-side paper feeding portion 40 one by one to the above-described transport path.

The main-body-side support member 36 is a member that is long in the X-axis direction, and is fixed to a portion of the main body portion 12 on the −Y side of the pair of feed rollers 34. An inclined surface 37 and an abutting portion 38 are formed on the main-body-side support member 36.

The inclined surface 37, when viewed in the X-axis direction, is inclined so that the +Y side is located more toward the −Z side than is the −Y side. Here, the plane along the XY plane is referred to as a virtual plane K1. When viewed in the X-axis direction, an angle that is an acute angle formed by the virtual surface K1 and the inclined surface 37 is referred to as an angle θ1.

The abutting portion 38 extends from a −Z side end portion of the inclined surface 37 toward the +Y side in a direction intersecting the inclined surface 37. In addition, the abutting portion 38 aligns the −Z side end surface of the paper sheet P and supports the paper sheet P by abutting against the −Z side end portion of the paper sheet P.

Rear-Surface-Side Paper Feeding Portion

Figure 4:
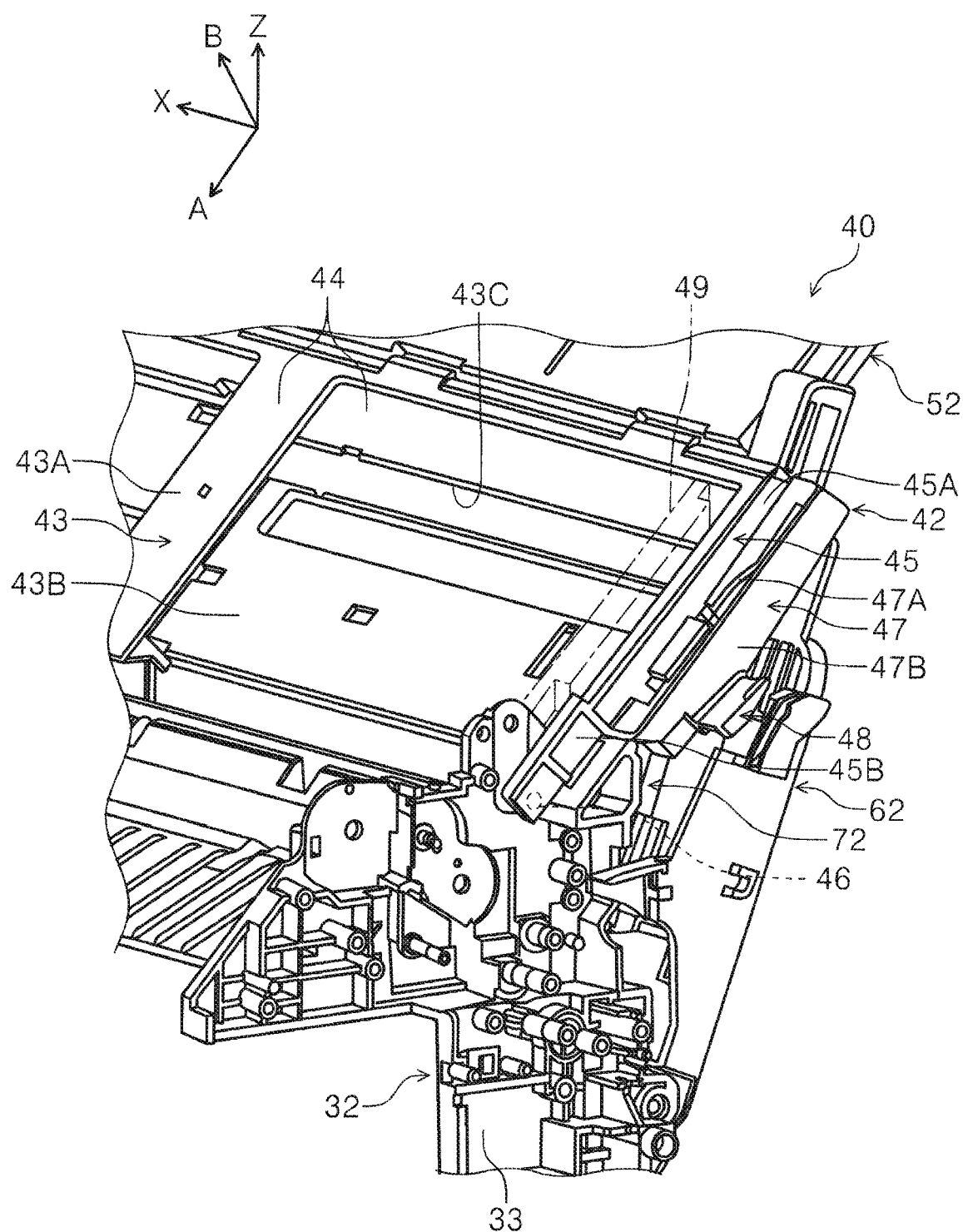
FIG. 4 is a perspective view illustrating a portion of a first support portion and a housing portion according to the embodiment.

The rear-surface-side paper feeding portion 40 illustrated in FIG. 4 is an example of a medium supplying apparatus. In addition, the rear-surface-side paper feeding portion 40 has a first support portion 42, a second support portion 52, a housing portion 62, and a holding portion 72. Furthermore, the rear-surface-side paper feeding portion 40 has a rear-surface-side cover 82 (FIG. 3).

Figure 6:
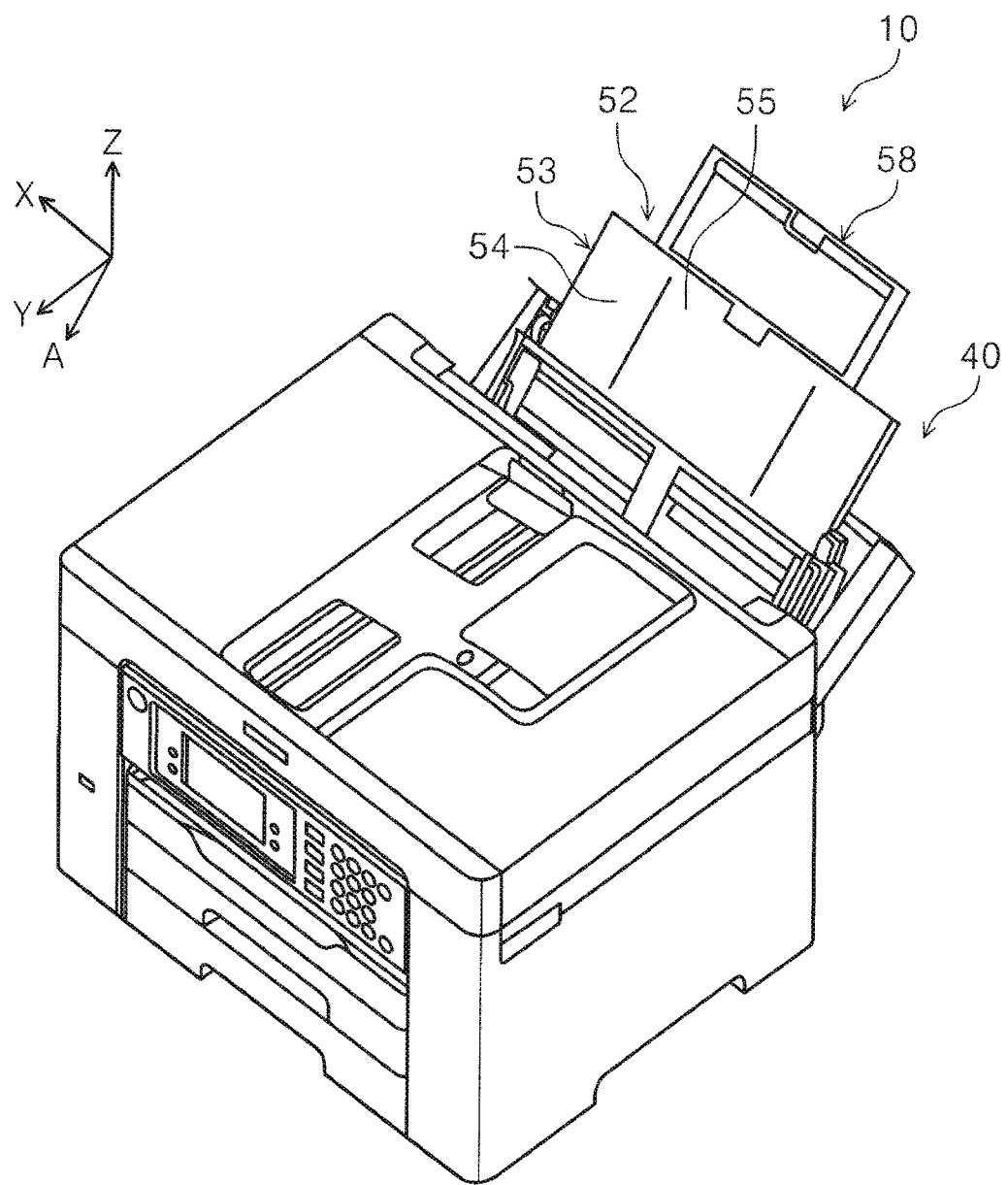
FIG. 6 is a perspective view illustrating a deployed state of a second support portion of the printer according to the embodiment.

Further, the rear-surface-side paper feeding portion 40 is formed symmetrically with respect to the center in the X-axis direction except for a portion. Therefore, hereinafter, a portion on the −X side of the rear-surface-side paper feeding portion 40 will be mainly described, and description of a portion on the +X side may be omitted. FIG. 2 illustrates a closed state of the rear-surface-side paper feeding portion 40 in which each member of the rear-surface-side paper feeding portion 40 is covered by the rear-surface-side cover 82. On the other hand, FIG. 6 illustrates an open state of the rear-surface-side paper feeding portion 40 in which each member of the rear-surface-side paper feeding portion 40 is exposed.

First Support Portion

The first support portion 42 illustrated in FIG. 4 is an example of a first supporting portion. In addition, the first support portion 42 is configured to include, for example, a supporting plate 43, a first side portion 45, a second side portion 47, and a side cursor 49.

Supporting Plate

The supporting plate 43 is formed in a rectangular shape that is long in the X-axis direction. In addition, for example, the supporting plate 43 has a thicker center portion in the X-axis direction than other portions. The surface of the +Z side portion of the supporting plate 43 when the rear-surface-side paper feeding portion 40 is in the open state is referred to as a first supporting surface 44. In other words, the supporting plate 43 is formed with the first supporting surface 44. In addition, the first supporting surface 44 supports the paper sheet P.

In addition, the supporting plate 43 includes a thick portion 43A formed in the center portion and peripheral portions of the supporting plate 43 in the X-axis direction and a thin portion 43B having a height slightly lower than the height of the thick portion 43A. A through hole 43C that is rectangular and long in the X-axis direction is formed in the thin portion 43B.

Figure 7:
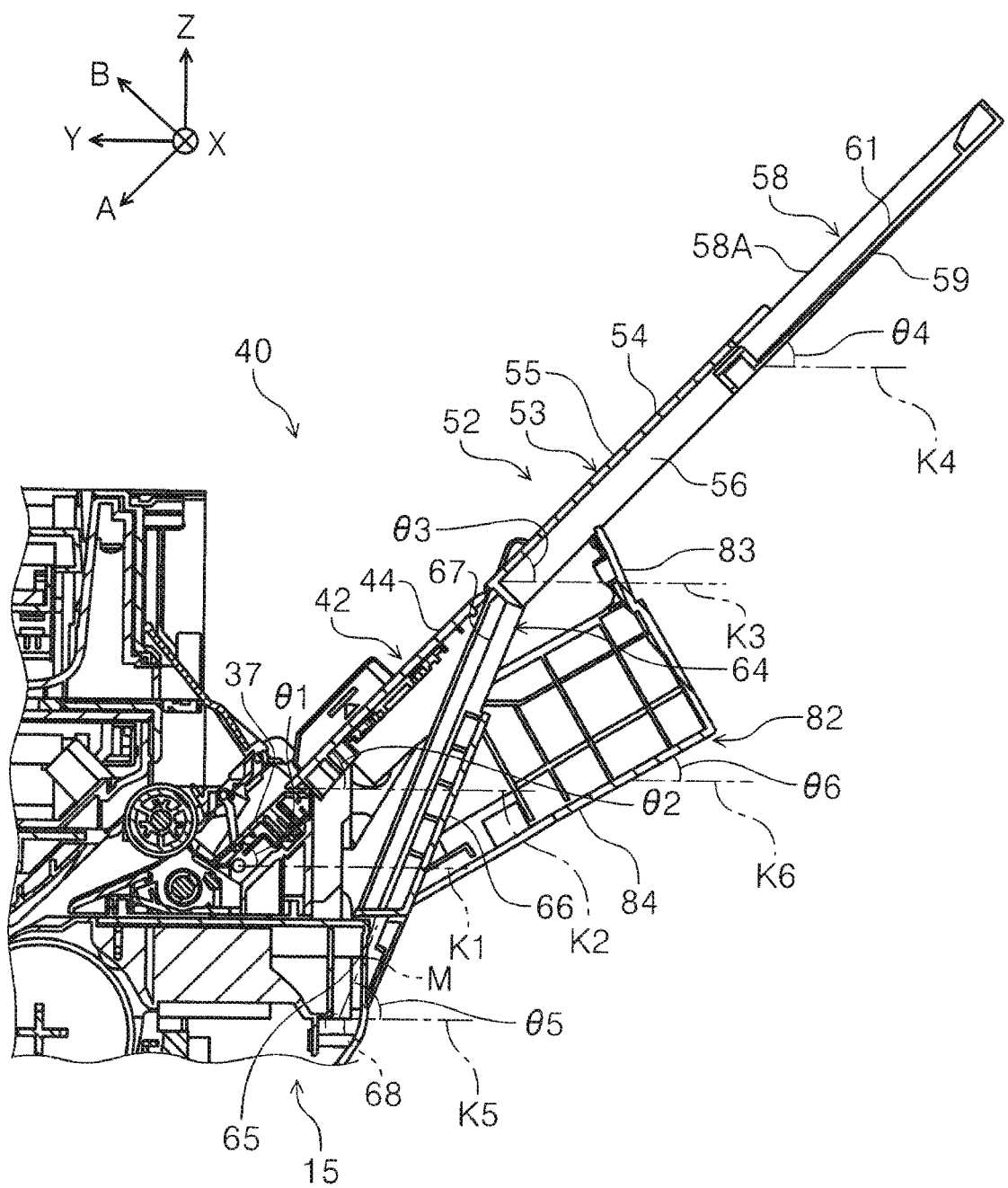
FIG. 7 is a side sectional view illustrating the deployed state of the second support portion in the rear-surface-side paper feeding portion according to the embodiment.

As illustrated in FIG. 7, when the rear-surface-side paper feeding portion 40 is in the open state, the inclination direction of the first supporting surface 44 is referred to as the A axis direction. The A-axis direction is an example of a supply direction in which the paper sheet P is supplied. In the A-axis direction, the downstream to which the paper sheet P is supplied is called the +A side, and the upstream is called the −A side.

The X-axis direction is an example of a width direction that intersects the A-axis direction. The Z-axis direction is an example of a height direction that intersects the A-axis direction. Further, the normal direction perpendicular to the A-axis direction and the X-axis direction is referred to as the B-axis direction. In the B-axis direction, the side on which the paper sheet P is placed is referred to as the +B side, and the side on which the paper sheet P is not placed is referred to as the −B side.

The first supporting surface 44 is, when viewed in the X-axis direction, inclined so that the +Y side is located more toward the −Z side than is the −Y side. In addition, the first supporting surface 44 is located on the −A side of the above-described inclined surface 37. Here, the plane along the XY plane is referred to as a virtual plane K2. When viewed in the X-axis direction, an acute angle formed by the virtual surface K2 and the first supporting surface 44 is referred to as an angle θ2. As an example, the angle θ2 is substantially the same as the angle θ1 described above.

First Side Portion

The first side portion 45 illustrated in FIG. 4 is a portion protruding from the −X side end portion of the thick portion 43A to the +B side. In addition, the first side portion 45 is formed in a crank shape when viewed in the B-axis direction. Specifically, the first side portion 45 includes a side portion 45A aligned with the thin portion 43B in the X-axis direction, and a to-be-held portion 45B extending from the +A side end portion of the side portion 45A toward the +A side.

The to-be-held portion 45B is formed in a plate shape with the X-axis direction as the thickness direction. In addition, the to-be-held portion 45B extends further toward the +A side than does the thin portion 43B. At the +A side end portion of the to-be-held portion 45B, a shaft portion 46 protruding in the X-axis direction toward a portion of a corresponding one of the side plates 33 is formed.

Figure 11:
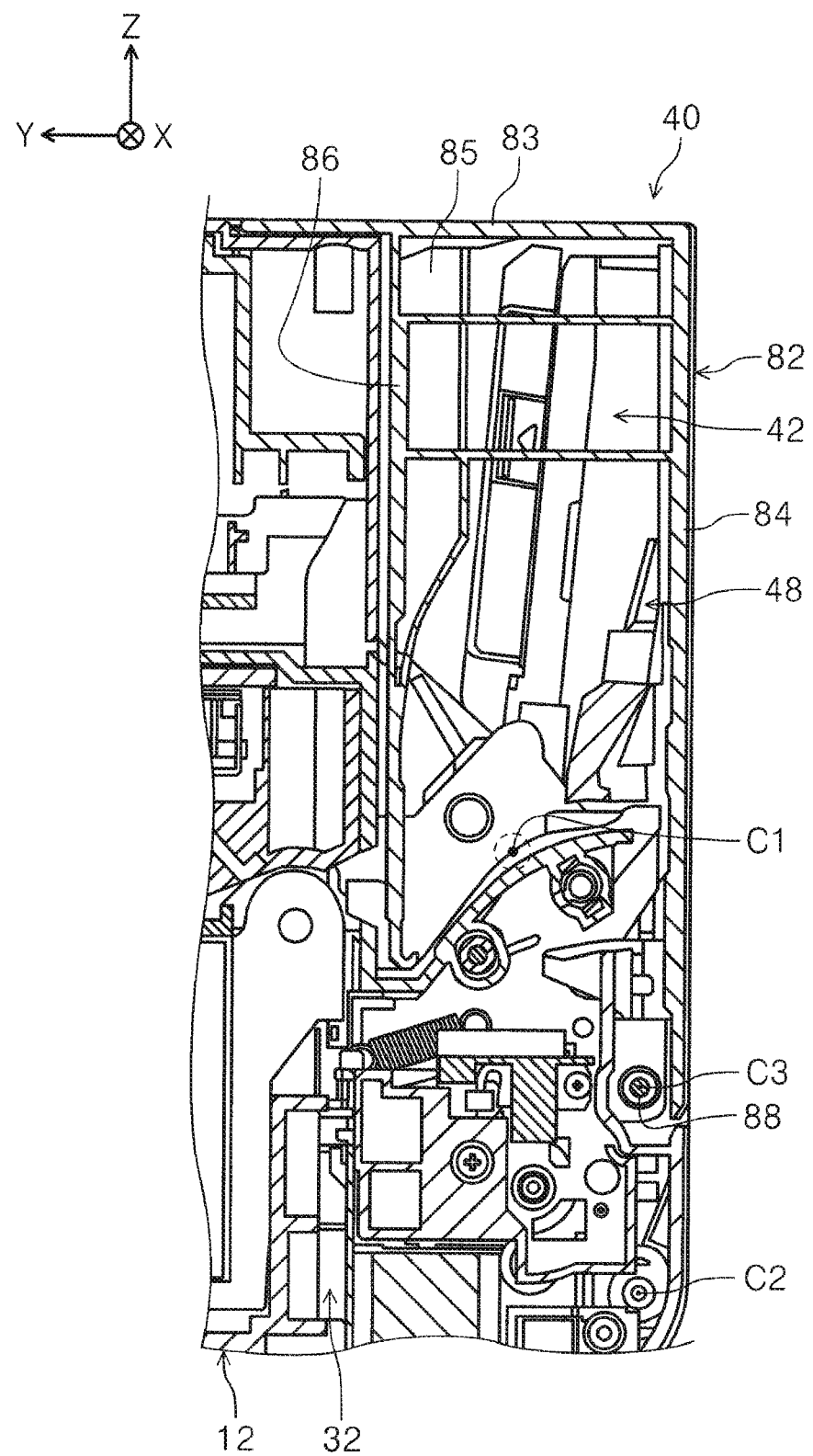
FIG. 11 is a side sectional view (sectional view taken along line XI-XI in FIG. 1) illustrating an internal configuration of the rear-surface-side paper feeding portion according to the embodiment.

The shaft portion 46 is formed in a cylindrical shape. In addition, the shaft portion 46 is pivotally supported by a bearing (not illustrated) provided on each of the side plates 33. In other words, the first support portion 42 is provided on the main body frame 32 so as to be configured to incline with the X-axis direction as the axial direction. Further, the point that represents the pivot center of the shaft portion 46 when viewed in the X-axis direction is referred to as a fulcrum C1 (FIG. 11).

Second Side Portion

The second side portion 47 has an upper wall portion 47A, a side wall portion 47B, and a to-be-pressed portion 48. The upper wall portion 47A extends from a −B side end portion of the first side portion 45 to the −X side. The side wall portion 47B extends from a −X side end portion of the upper wall portion 47A to the −B side.

The to-be-pressed portion 48 protrudes toward the −X side from a portion on a +A side of the center of the side wall portion 47B in the A axis direction and on a −B side of the center of the side wall portion 47B in the B axis direction.

When viewed in the X-axis direction, the to-be-pressed portion 48 may have, for example, an inverted trapezoidal cross section with an upper base on the −B side and a lower base on the +B side.

Figure 8:
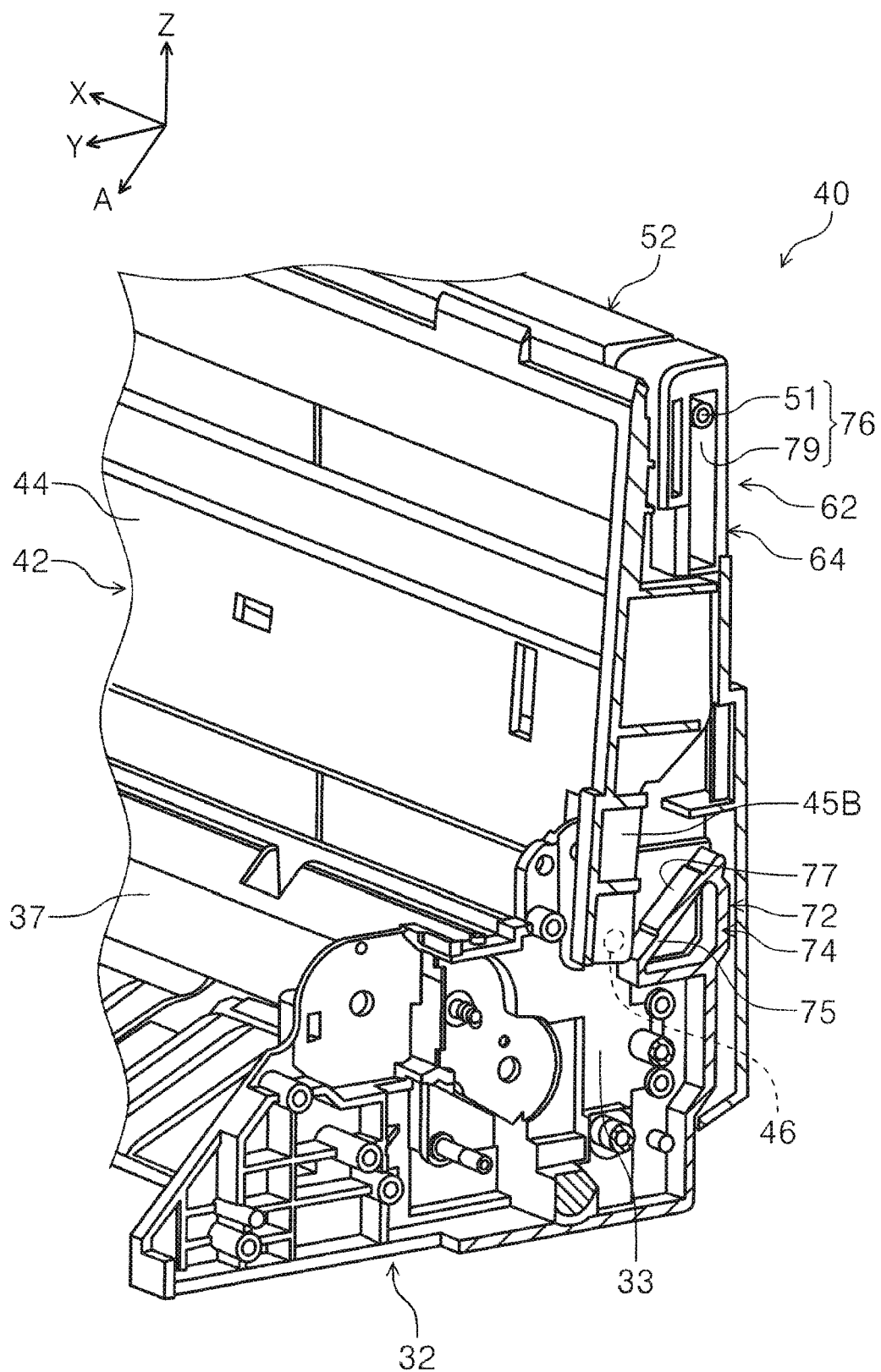
FIG. 8 is a perspective view illustrating a non-use state of the first support portion and the housing portion according to the embodiment.

The first support portion 42 illustrated in FIG. 8 is provided with a guide pin 51 as an example of an insertion portion. Further, details of the guide pin 51 will be described later.

As described above, the first support portion 42 in the non-use state is switched to the use state, in which the first supporting surface 44 thereof supports the paper sheet P, when inclined with respect to the main body frame 32. Further, in this embodiment, a storage state in which the first support portion 42 is stored on the main body frame 32 side is an example of the non-use state.

Side Cursor

A portion of the side cursor 49 illustrated in FIG. 4 is inserted into the through hole 43C and is configured to move in the X-axis direction. In addition, the side cursor 49 positions the −X side end portion of the paper sheet P by coming into contact with the −X side end portion of the paper sheet P.

Second Support Portion

Figure 5:
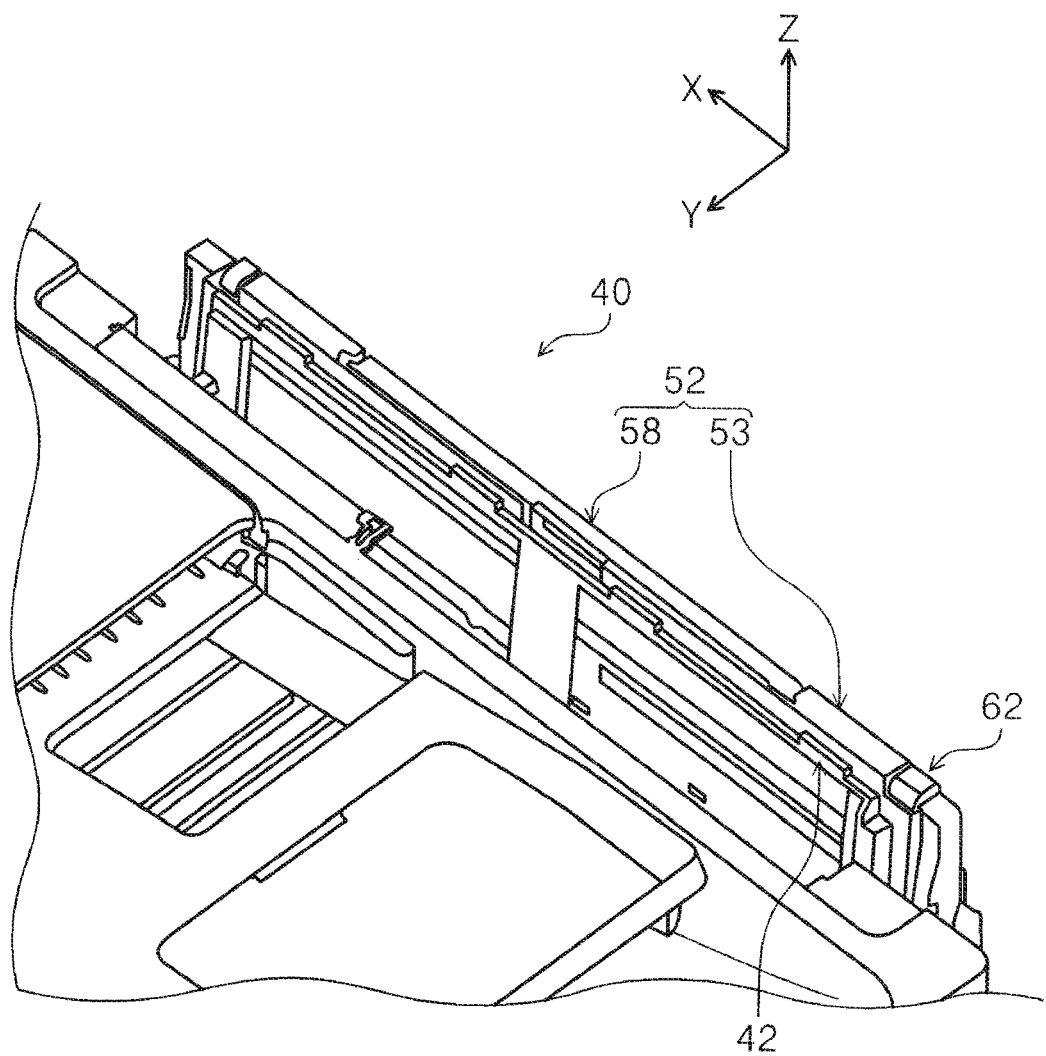
FIG. 5 is a perspective view illustrating a state in which a cover member of the rear-surface-side paper feeding portion according to the embodiment has been removed.

The second support portion 52 illustrated in FIG. 5 is an example of a second supporting portion. In addition, the second support portion 52 is configured to include, for example, a main support portion 53 and a sub-support portion 58. Further, in FIG. 5, the rear-surface-side cover 82 (FIG. 1), which will be described later, is omitted to facilitate understanding of the second support portion 52.

Main Support Portion

The main support portion 53 illustrated in FIG. 6 has a supporting plate 54. The supporting plate 54 is formed in a rectangular shape that is long in the X-axis direction. When the rear-surface-side paper feeding portion 40 is in the open state, the surface of the supporting plate 54 on the side on which the paper sheet P is placed is referred to as a second supporting surface 55. In other words, the second supporting surface 55 is formed on the second support portion 52. In addition, the second supporting surface 55 supports the paper sheet P.

A pair of guide rails 56 are provided on the −B side of the supporting plate 54 illustrated in FIG. 7. The pair of guide rails 56 are disposed with an interval in the X-axis direction and extend along the A-axis direction, and hold the sub-support portion 58, which will be described later, along the A-axis direction so that it can be pulled out and stored.

Side walls and protruding portions (not illustrated) are formed on both end portions of the supporting plate 54 in the X-axis direction and outside the pair of guide rails 56. The side walls extend from the supporting plate 54 to the −B side. The protruding portions protrude outward from the +A side end portions of the side walls in the X-axis direction.

When the rear-surface-side paper feeding portion 40 is in the open state, the second supporting surface 55 is, when viewed in the X-axis direction, inclined so that the +Y side is located more toward the −Z side than is the −Y side. In addition, the second supporting surface 55 is located on the −A side of the first supporting surface 44. In other words, the second support portion 52 is disposed on upstream in the A axis direction with respect to the first support portion 42 in the use state.

Here, the plane along the XY plane is referred to as a virtual plane K3. When viewed in the X-axis direction, an acute angle formed by the virtual surface K3 and the second supporting surface 55 is referred to as an angle θ3. The angle θ3 is, for example, substantially the same as the angle θ1 or the angle θ2 described above.

Sub-Support Portion

The sub-support portion 58 has a supporting plate 59. The supporting plate 59 is formed in a rectangular shape that is long in the X-axis direction. Guide portions 58A, which are thicker than the supporting plate 59, are formed at both ends of the supporting plate 59 in the X-axis direction. The guide portions 58A are held by the pair of guide rails 56 and are configured to slide along the A axis direction.

The surface of the supporting plate 59 on which the paper sheet P is placed when the rear-surface-side paper feeding portion 40 is in the open state is referred to as an auxiliary supporting surface 61. The auxiliary supporting surface 61 is included as an example of the second supporting surface and supports the paper sheet P.

The auxiliary supporting surface 61 is, when viewed in the X-axis direction, inclined so that the +Y side is located more toward the −Z side than is the −Y side. In addition, the auxiliary supporting surface 61 is located on the −A side of the second supporting surface 55. Here, the plane along the XY plane is referred to as a virtual plane K4. When viewed in the X-axis direction, an acute angle formed by the virtual surface K4 and the auxiliary supporting surface 61 is referred to as an angle θ4. The angle θ4, is, for example, substantially the same as the angle θ1, the angle θ2, or the angle θ3 described above.

Housing Portion

The housing portion 62 has, for example, a pair of guide arms 64, a bottom wall 65, and a rear wall 66.

The pair of guide arms 64 are disposed with an interval in the X-axis direction. The guide arms 64 are configured as members elongated in one direction. The length of the guide arms 64 in the axial direction is, for example, substantially the same as the length from a −Z side portion of the reversing unit 15 to a +Z side portion of the rear-surface-side paper feeding portion 40 when the rear-surface-side paper feeding portion 40 is in the closed state. Guide grooves 67 are respectively formed inside the pair of guide arms 64 in the X-axis direction to guide the above-mentioned protruding portions of the main support portion 53 in the axial direction of the guide arms 64.

In the axial direction of the guide arms 64, at one end portion of the guide grooves 67 on the +Z side, a restricting portion (not illustrated) that restricts pivoting of a corresponding protruding portion of the main support portion 53 is formed. As a result, when the main support portion 53 is pulled out along the guide grooves 67 and then inclined to the −Y side with respect to the Z-axis direction, pivoting thereof is restricted by the restricting portion, and the angle θ3 inclined state is maintained.

In other words, the housing portion 62 is provided in the main body frame 32 so as to be configured to incline toward an upstream of the first support portion 42 in the A-axis direction. Furthermore, the housing portion 62 houses the second support portion 52 in a retracting manner.

At the other end portion of the guide arms 64 on the −Z side in the axial direction, shaft portions 68 protruding outward in the X-axis direction are formed. The shaft portions 68 are pivotally supported by bearings (not illustrated) provided on the main body frame 32 (FIG. 4). Further, when viewed in the X-axis direction, the point that represents the pivot center of the shaft portions 68 is referred to as a fulcrum C2 (FIG. 11).

In this way, the guide arms 64 are inclined with respect to the Z-axis direction when the shaft portion 68 is pivoted. Further, a center axis of the guide arms 64 is referred to as an axis M. In addition, a plane along the XY plane is referred to as a virtual plane K5. When viewed in the X-axis direction, an angle formed by the virtual plane K5 and the central axis M that is an acute angle is referred to as an angle θ5. The angle θ5 is set to be larger than the angle θ2 described above.

The bottom wall 65 links, in the X-axis direction, portions of the pair of guide arms 64 located between axial-direction center portions and the shaft portions 68 of the pair of guide arms 64. In addition, the bottom wall 65 is formed in a plate shape along the XY plane when the pair of guide arms 64 are in an inclined state.

The rear wall 66 extends from an end portion of the bottom wall 65 on the −Y side toward one end side along the axial direction of the guide arms 64. A distal end portion of the rear wall 66 is located between the axial-direction center portions of the guide arms 64 and the restricting portions.

As described above, the housing portion 62 is formed in a box shape with an opening, and is capable of housing the second support portion 52.

Holding Portion

The holding portion 72 in FIG. 8 is a portion that holds the first support portion 42 and the housing portion 62 in an inclined orientation with respect to the Z-axis direction so that the first supporting surface 44 and the second supporting surface 55 (FIG. 7) are aligned in the A-axis direction. Specifically, the holding portion 72 has, for example, a contact portion 74 and an interlocking portion 76.

Contact Portion

The contact portion 74 is provided on each of the side plates 33 of the main body frame 32. In addition, the contact portion 74 is disposed so as to come into contact with the first support portion 42 when in a use state. Specifically, the contact portion 74 protrudes from the side plate 33 toward the outside in the X-axis direction. The shape of the contact portion 74 when viewed in the X-axis direction is, for example, a hexagonal tube shape in which each corner portion of a triangle has been cut off. The contact portion 74 has an inclined wall 75.

The inclined wall 75 is, when viewed in the X-axis direction, inclined so that the +Y side is located more toward the −Z side than is the −Y side. A surface of the inclined wall 75 on the +Z side is referred to as a contact surface 77.

The contact surface 77 is disposed at a position on the −Y side and the +Z side with respect to the shaft portion 46. As a result, when the first support portion 42 is inclined to be in the use state, and when the to-be-held portion 45B comes into contact with the contact surface 77, the inclination orientation of the first support portion 42 is held.

Interlocking Portion

The interlocking portion 76 has, for example, a guide groove 79 formed in the housing portion 62 and the guide pin 51 inserted in the guide groove 79.

The guide groove 79 is formed on a distal end side of the center of the guide arms 64 in the axial direction and on the outer side in the X-axis direction. In addition, the guide groove 79 is recessed toward the center side in the X-axis direction and extends in the axial direction of the guide arms 64.

The guide pin 51 is formed in a columnar shape the axial direction of which is the X-axis direction. In addition, the guide pin 51 protrudes toward the center side in the X-axis direction from a +Z side end portion of the second side portion 47 (FIG. 4) when the rear-surface-side paper feeding portion 40 is in the closed state. The size of the guide pin 51 is such that it can come into contact with the inner wall surface of the guide groove 79.

Figure 9:
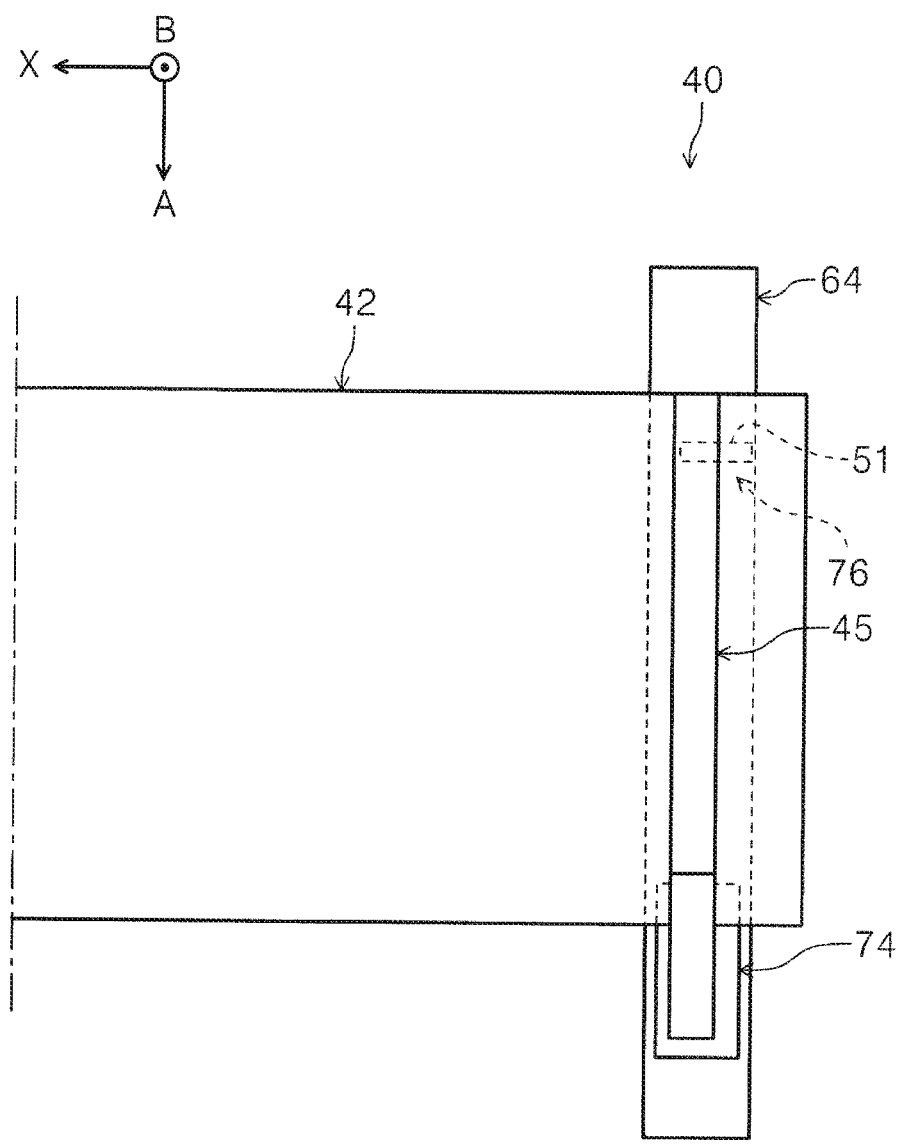
FIG. 9 is a schematic diagram illustrating the first support portion, the housing portion, and a contact portion according to the embodiment.

As illustrated in FIG. 9, in a state in which the first support portion 42 and the guide arm 64 are inclined, when viewed in the B-axis direction, the contact portion 74 and the interlocking portion 76 are disposed at the same position in the X-axis direction intersecting the A-axis direction. Specifically, when each member is projected in the B-axis direction, the first side portion 45 of the first support portion 42, the contact portion 74, and the guide pin 51 overlap with each other.

Here, when the rear-surface-side paper feeding portion 40 is in the closed state as illustrated in FIG.8, when the first support portion 42 is inclined about the shaft portion 46, the guide pin 51 also moves around the shaft portion 46 while drawing an arcuate locus.

Figure 10:
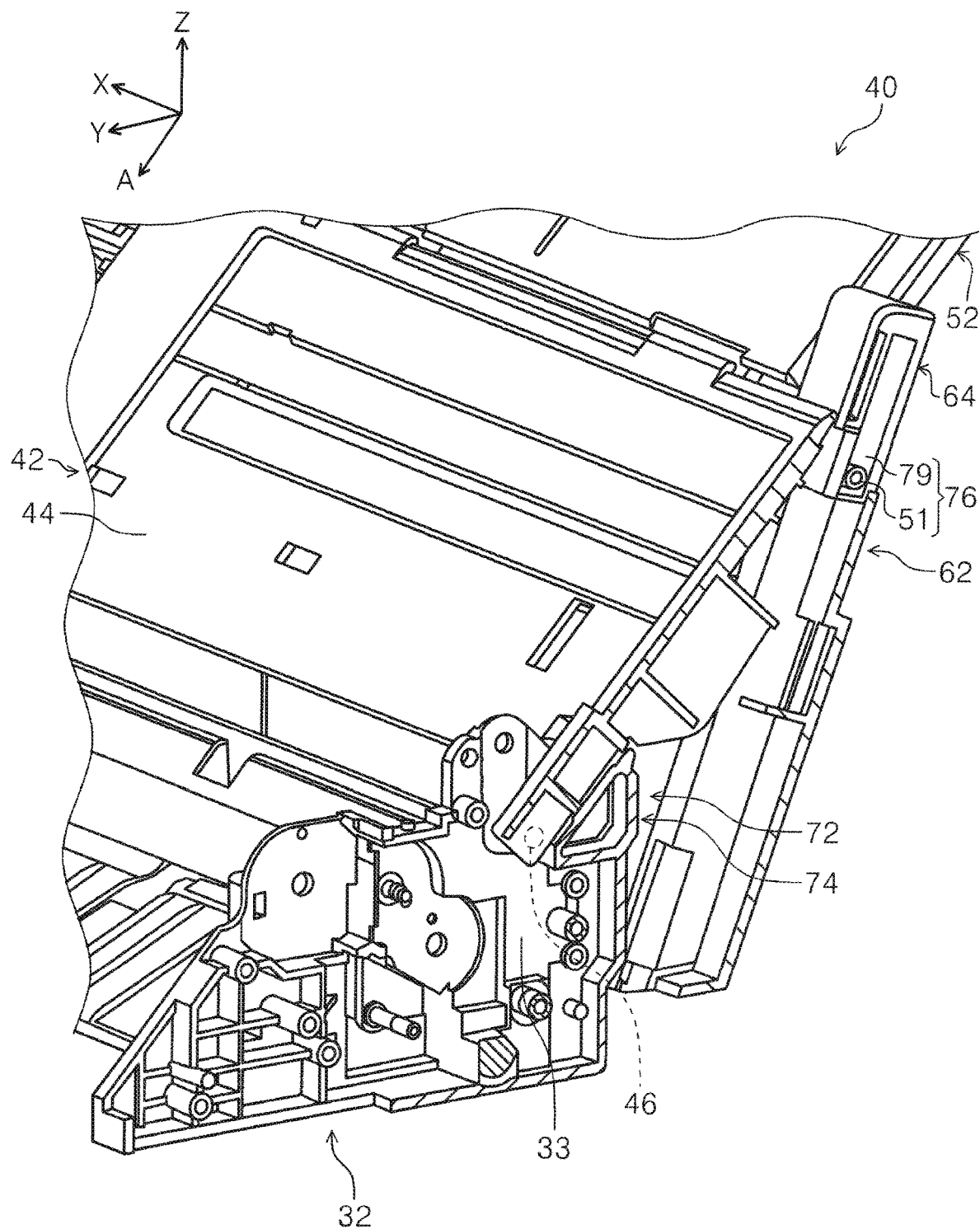
FIG. 10 is a perspective view illustrating an inclination state of the first support portion and the housing portion according to the embodiment.

At this time, as illustrated in FIG. 10, the guide pin 51 contacts the inner wall surface of the guide groove 79, whereby the guide arms 64 are inclined. As described above, the interlocking portion 76 is provided in the first support portion 42 and the housing portion 62, and is configured to interlock the inclination of the first support portion 42 with respect to the Z-axis direction and the inclination of the housing portion 62 with respect to the Z-axis direction.

Rear-Surface-Side Cover

The rear-surface-side cover 82 illustrated in FIG. 2 is an example of an opening/closing member. In addition, the rear-surface-side cover 82 has, for example, an upper wall 83, a rear wall 84, a pair of side walls 85, and a pair of front walls 86 (FIG. 11).

The upper wall 83 is, when the rear-surface-side paper feeding portion 40 is in the closed state, formed in a rectangular plate shape that is long in the X-axis direction and short in the Y-axis direction. Further, the upper surface of the upper wall 83 on the +Z side and the upper surface of the ADF unit 26 on the +Z side are aligned at substantially the same height.

The rear wall 84 extends from a −Y side end portion of the upper wall 83 to the −Z side along the XZ plane. In addition, the rear wall 84 covers the first support portion 42 and the second support portion 52 (FIG. 5) together with the rear wall 66 from the −Y side.

The pair of side walls 85 cover the space formed by the upper wall 83 and the rear wall 84 from both sides in the X-axis direction.

Figure 14:
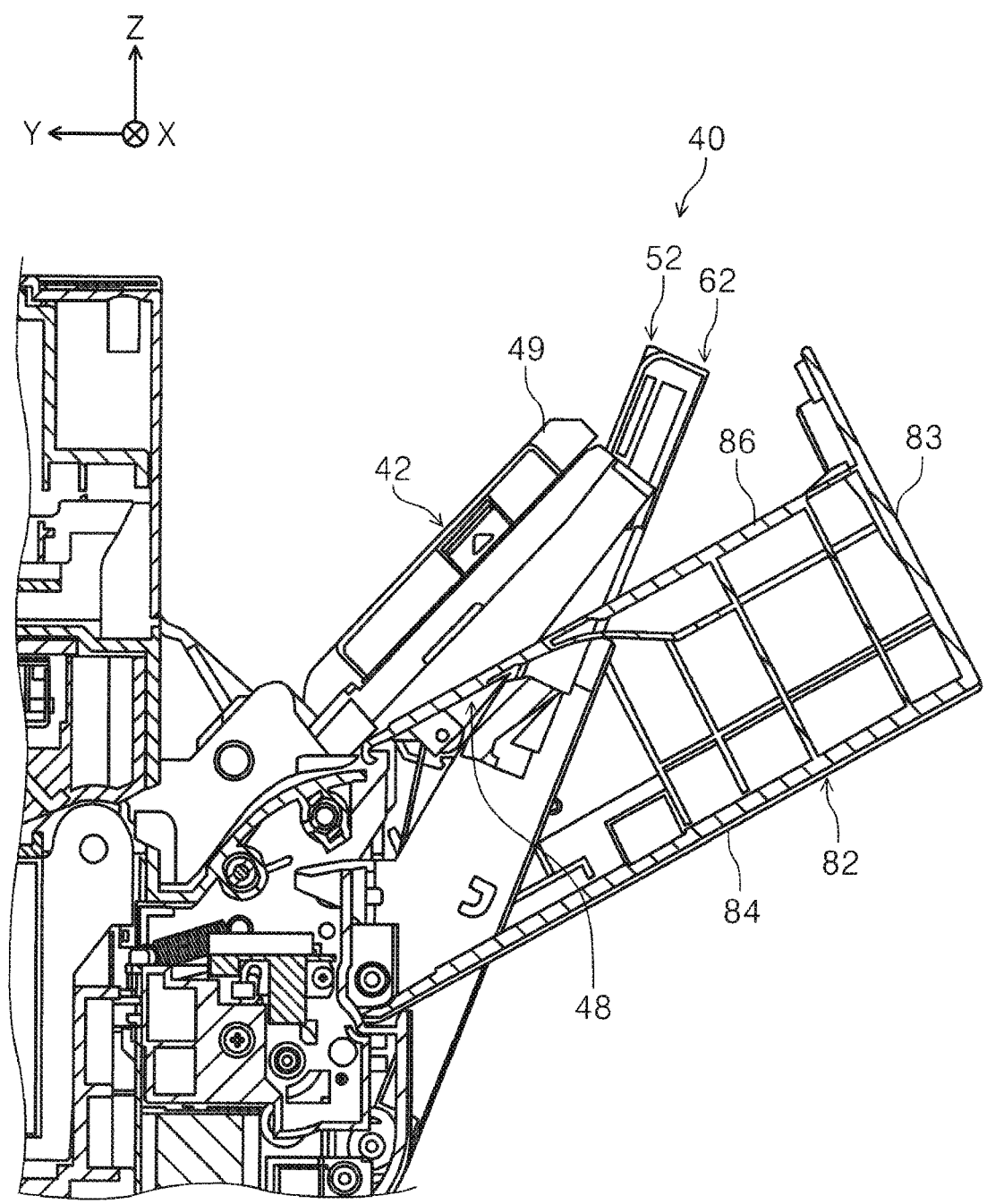
FIG. 14 is a side sectional view illustrating the internal configuration of the rear-surface-side paper feeding portion according to the embodiment when the cover member in the opened state.

The pair of front walls 86 illustrated in FIG. 14 are disposed on one side and another side of the first support portion 42, the second support portion 52, and the housing portion 62 in the X-axis direction. Further, in FIG. 14, the −X side front wall 86 is illustrated, and the +X side front wall 86 is omitted. In addition, the pair of front walls 86 are disposed to face one end portion and another end portion of the rear wall 84 in the X-axis direction.

A portion of the front wall 86 comes into contact with the to-be-pressed portion 48 and presses the to-be-pressed portion 48 toward the −Y side when the rear-surface-side cover 82 is inclined. In other words, when the rear-surface-side cover 82 is inclined, the front wall 86 comes into contact with the to-be-pressed portion 48, and the first support portion 42 is inclined in conjunction with the rear-surface-side cover 82.

A shaft portion 88 is formed at a portion that is a −Y side end portion and a −Z side end portion of the side wall 85 illustrated in FIG. 11.

The shaft portion 88 is formed in a cylindrical shape with the X-axis direction as the axial direction. In addition, the shaft portion 88 is pivotally supported by a bearing (not illustrated) provided in a portion of the main body frame 32.

That is, the rear-surface-side cover 82 is provided on the main body frame 32 so as to be configured to incline.

In the case where the rear-surface-side paper feeding portion 40 is in the closed state, when the rear-surface-side cover 82 is pivoted about the shaft portion 88, the main body portion 12 is exposed and the rear-surface-side paper feeding portion 40 takes an open state. On the other hand, in the case where the rear-surface-side paper feeding portion 40 is in the open state, when the rear-surface-side cover 82 is pivoted about the shaft portion 88 to the opposite side, the rear-surface-side paper feeding portion 40 takes the closed state. In this way, the rear-surface-side cover 82 is provided on the main body frame 32 so as to be configured to open and close.

In other words, the rear-surface-side cover 82 covers the first support portion 42, the second support portion 52, and the housing portion 62 (FIG. 4) in the closed state, and when transitioning from the closed state to the open state, the first support portion 42 and the housing portion 62 are inclined and exposed. Further, the point representing the pivot center of the shaft portion 88 when viewed in the X-axis direction is referred to as a fulcrum C3.

In the Z-axis direction, which is an example of a height direction that intersects the A-axis direction, a third height position of the fulcrum C3 of inclination of the rear-surface-side cover 82 is, for example, a position between a first height position of the fulcrum C1 of inclination of the first support portion 42 and a second height position of the fulcrum C2 of inclination of the housing portion 62.

As illustrated in FIG. 7, the plane along the XY plane is referred to as a virtual plane K6. When viewed in the X-axis direction, an acute angle formed by the virtual plane K6 and the rear wall 84 is referred to as an angle θ6. The angle θ6 is set to be smaller than the angle θ2 or the angle θ5 described above.

The upper wall 83 of the rear-surface-side cover 82, in the inclined state, is disposed so as to support the second support portion 52 in the use state from the −Z side.

Description of Operation and Effect of Embodiment

Figure 12:
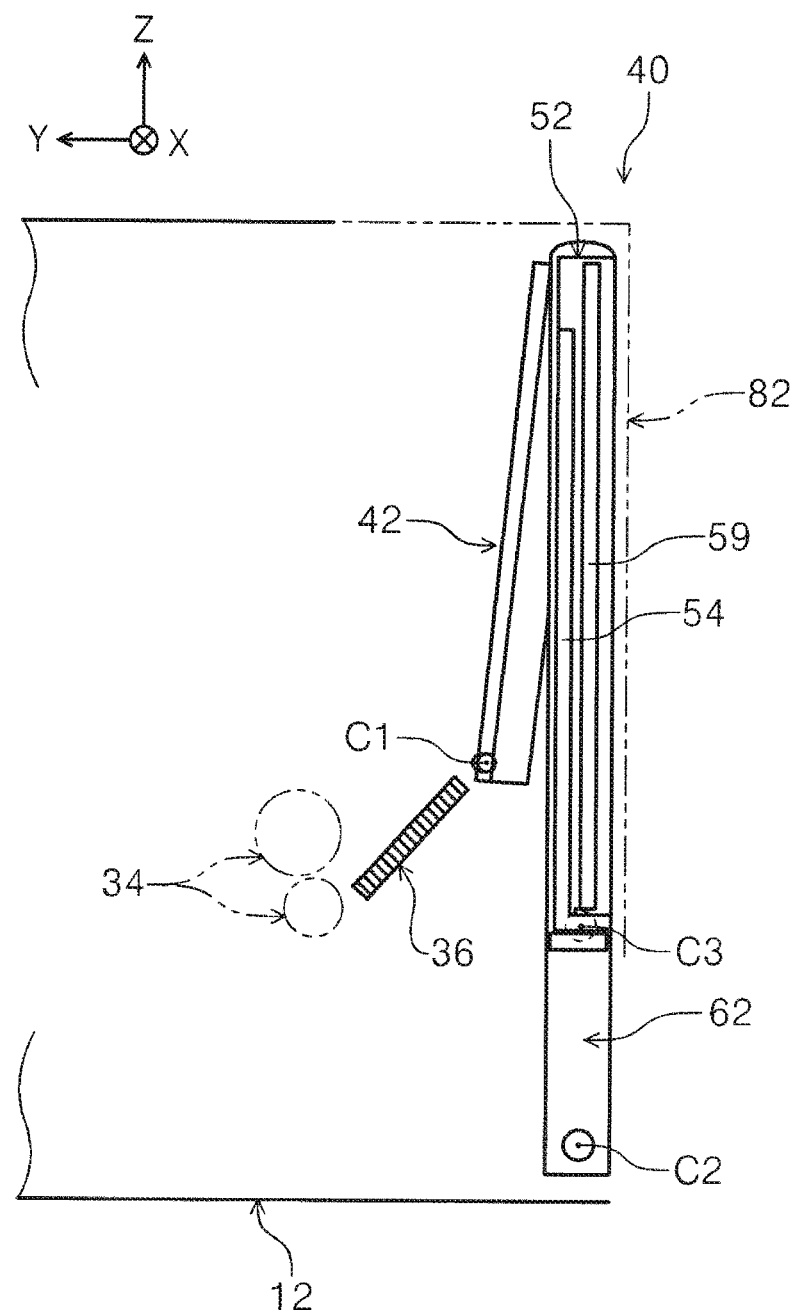
FIG. 12 is a schematic diagram illustrating a non-use state of the first support portion, the second support portion, and the housing portion according to the embodiment.

When the rear-surface-side paper feeding portion 40 illustrated is in the closed state as illustrated in FIG. 12, the second support portion 52 and the housing portion 62 are upright in a state substantially along the Z-axis direction. In addition, the inclination angle of the first support portion 42 with respect to the XY plane is larger than the inclination angle of the main-body-side support member 36 with respect to the XY plane.

In other words, the first support portion 42 is also in a nearly upright arrangement state, like the second support portion 52 and the housing portion 62. As a result, compared with a configuration in which the first support portion 42 is fixed at the same angle as the angle of the main-body-side support member 36, the space required to store the first support portion 42, the second support portion 52, and the housing portion 62 inside the rear-surface-side cover 82 becomes smaller. That is, the rear-surface-side paper feeding portion 40 can be reduced in size.

Figure 13:
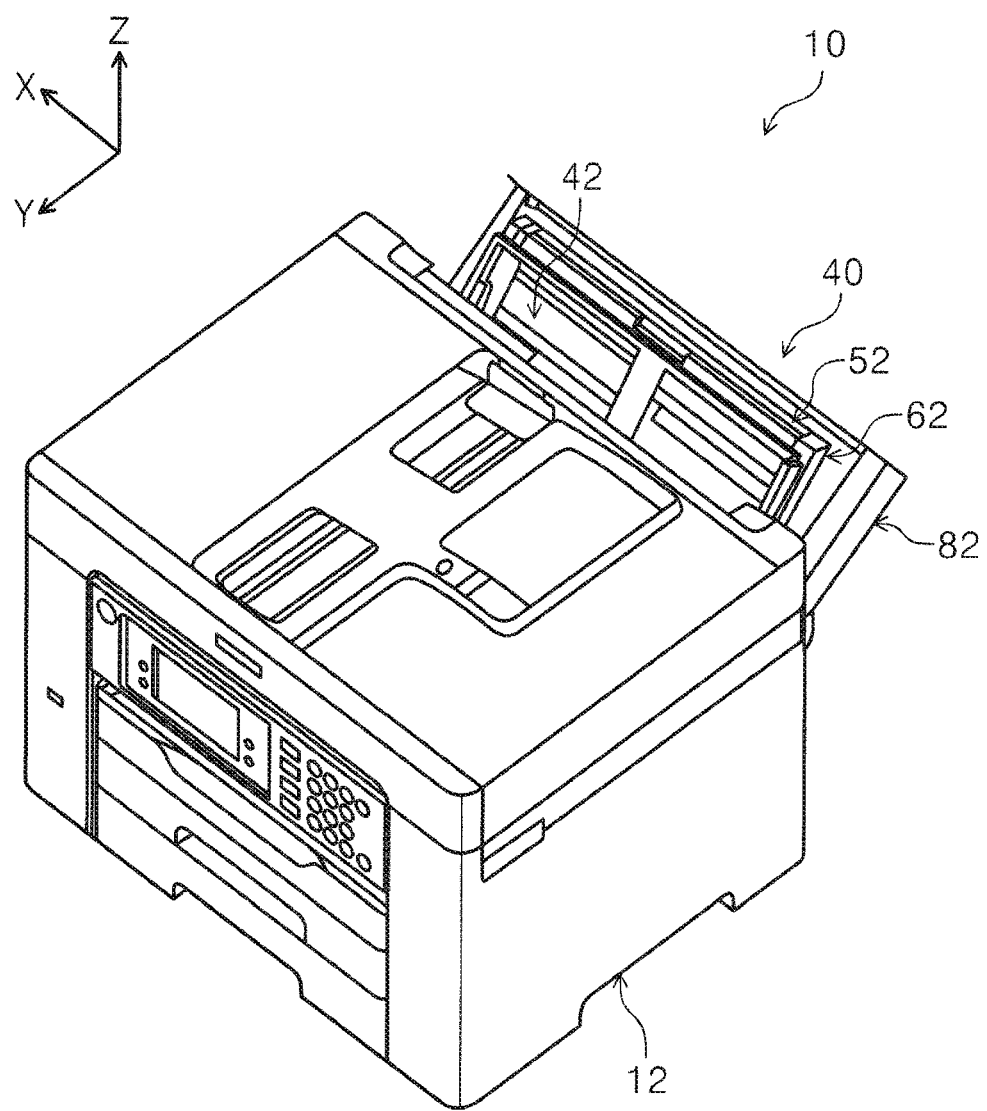
FIG. 13 is a perspective view illustrating a state in which a cover member of the printer according to the embodiment is in an opened state.

As illustrated in FIG. 13, a +Z side end portion of the rear-surface-side cover 82 is inclined toward the −Y side. In this case, as illustrated in FIG. 14, when the front wall 86 presses the to-be-pressed portion 48 toward the −Y side, the first support portion 42 is inclined in association with the rear-surface-side cover 82. Furthermore, since the first support portion 42 and the housing portion 62 and the second support portion 52 are interlocked by the interlocking portion 76 (FIG. 10), the housing portion 62 and the second support portion 52 are inclined in association with the first support portion 42. In this way, by inclining the rear-surface-side cover 82, it is possible to incline the first support portion 42, the second support portion 52, and the housing portion 62.

Further, the inclination orientation of the first support portion 42 is maintained by the contact of the first support portion 42 with the contact portion 74 (FIG. 10). Then, the inclination orientations of the housing portion 62 and the second support portion 52 are held in association with the first support portion 42.

Then, as illustrated in FIG. 7, the second support portion 52 is pulled out from the housing portion 62, and the sub-support portion 58 is further pulled out from the main support portion 53 of the second support portion 52. Here, the main support portion 53 is supported by the upper wall 83 of the rear-surface-side cover 82. In addition, the first supporting surface 44 and the second supporting surface 55 are lined up in the A-axis direction.

Figure 15:
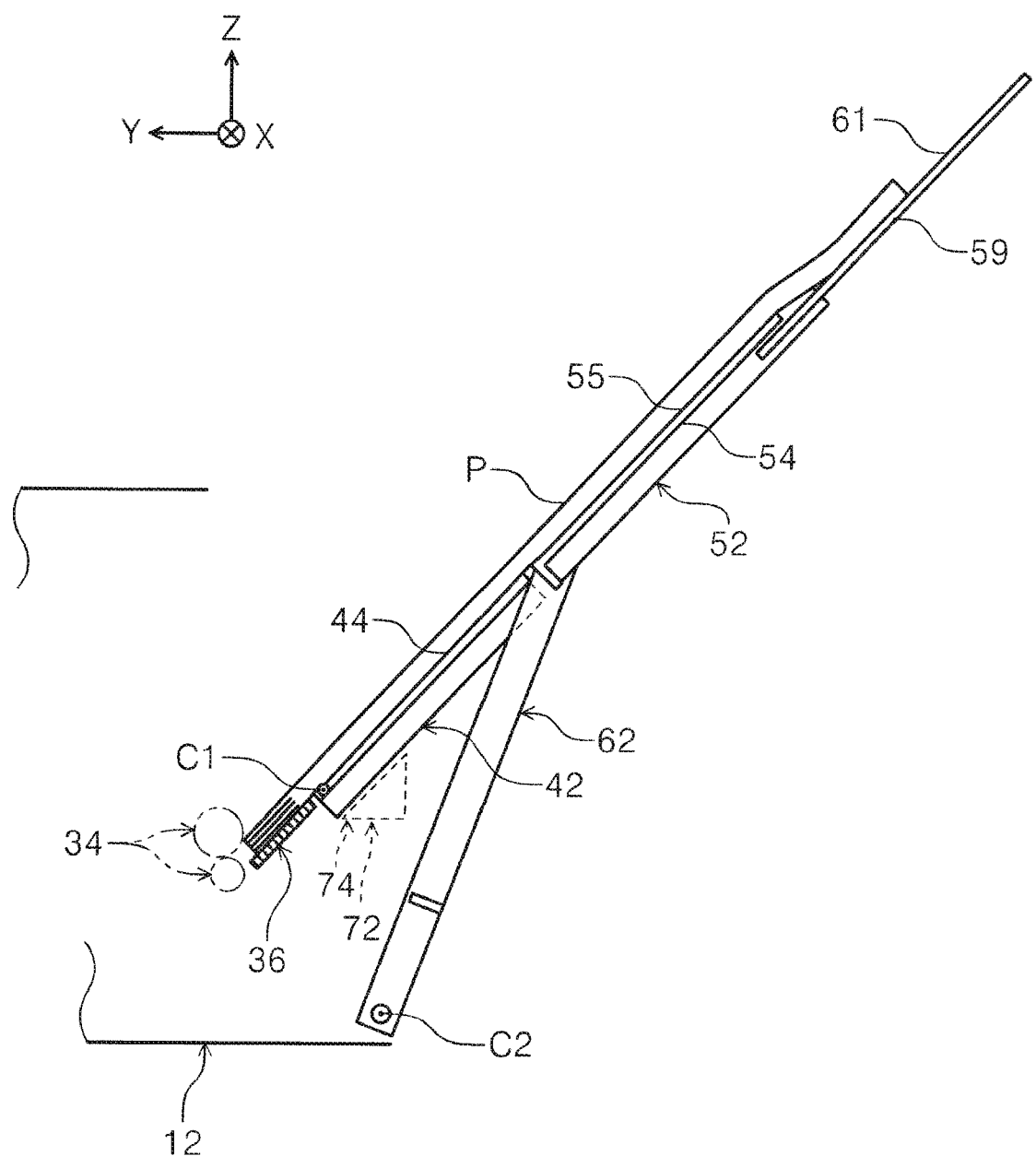
FIG. 15 is a schematic diagram illustrating an arrangement relationship of respective members when the second support portion according to the embodiment is in the deployed state.

Subsequently, as illustrated in FIG. 15, the first supporting surface 44, the second supporting surface 55, and the auxiliary supporting surface 61 support one or a plurality of paper sheets P from the −Z side. In this state, when the pair of feed rollers 34 are rotated, the paper sheets P are supplied to the image recording portion 14 (FIG. 1) one by one.

(1) In summary of the above description, according to this embodiment, when the first support portion 42 is inclined from the non-use state, the first support portion 42 is switched to the use state in which the first supporting surface 44 supports the paper sheet P.

The housing portion 62 is inclined toward an upstream of the first support portion 42 in the supply direction. Then, the second support portion 52 is pulled out from the housing portion 62 and is disposed upstream of the first support portion 42 in the supply direction of the paper sheet P.

The holding portion 72 holds the first support portion 42 and the second support portion 52 in an inclination orientation so that the first supporting surface 44 and the second supporting surface 55 are aligned in the supply direction.

Here, in the non-use state in which the first support portion 42 and the housing portion 62 are stored in the casing 13, compared with the inclination state of the first support portion 42 and the housing portion 62, the storage space required in one direction of the casing 13 is reduced. That is, as compared with a configuration in which the first support portion 42 is fixed in an inclination state, the rear-surface-side paper feeding portion 40 can be reduced in size.

(2) According to this embodiment, when the first support portion 42 is inclined, the second support portion 52 is also inclined by the interlocking portion 76. Here, the first support portion 42 comes into contact with the contact portion 74, whereby the inclination state of the first support portion 42 is maintained, and the inclination state of the housing portion 62 is maintained. Then, the second support portion 52 is pulled out from the housing portion 62, and the first supporting surface 44 and the second supporting surface 55 are disposed in the supply direction.

In this way, since the first support portion 42 and the housing portion 62 are interlocked by the interlocking portion 76, the first support portion 42 and the housing portion 62 can be held in an inclination state by performing only one step in which the first support portion 42 is inclined and brought into contact with the contact portion 74. That is, the work of holding the first support portion 42 and the housing portion 62 in the inclination state can be easily performed.

(3) According to this embodiment, when the inclination angle of the first support portion 42 changes, the contact position between the guide pin 51 and the guide groove 79 changes, and the inclination angle of the housing portion 62 changes. As described above, since it is only necessary to bring the guide groove 79 and the guide pin 51 into contact with each other, the first support portion 42 and the housing portion 62 can be interlocked with a simple configuration.

(4) According to this embodiment, the contact portion 74 and the interlocking portion 76 are disposed at the same position in the width direction. That is, the contact portion 74 and the interlocking portion 76 are close to each other. Here, when the load of the paper sheet P acts on the first support portion 42, since the interlocking portion 76 is located close to the contact portion 74 of the main body frame 32, the load can be more easily received by the main body frame 32 than a configuration in which the interlocking portion 76 is located away from the contact portion 74. In other words, since the load is less likely to act on the interlocking portion 76, it is possible to suppress deformation of the interlocking portion 76 when the paper sheet P is placed on the first support portion 42.

(5) According to this embodiment, in a state in which the rear-surface-side cover 82 is closed, since the first support portion 42, the second support portion 52, and the housing portion 62 are covered by the rear-surface-side cover 82, the first support portion 42, the second support portion 52, and the housing portion 62 are less likely to get dirty. In addition, when the rear-surface-side cover 82 is moved to the open state, since the rear-surface-side cover 82 inclines and exposes the first support portion 42 and the housing portion 62, it is not necessary to separately perform an opening operation for the rear-surface-side cover 82 and an inclination operation for the first support portion 42 and the housing portion 62.

In this way, it is possible to suppress the first support portion 42, the second support portion 52, and the housing portion 62 from being contaminated, and further, it is possible to reduce the operations required for operating the rear-surface-side paper feeding portion 40.

(6) The bottom surface of the casing 13 is used as a reference plane along the XY plane. In order for the rear-surface-side cover 82 to expose the first support portion 42 and the housing portion 62, the inclination angle of the rear-surface-side cover 82 with respect to the reference surface needs to be smaller than the inclination angle of the first support portion 42 with respect to the reference surface or the inclination angle of the housing portion 62 with respect to the reference surface.

Here, according to this embodiment, the third height position of the fulcrum C3 of inclination of the rear-surface-side cover 82 is located between the first height position of the fulcrum C1 of inclination of the first support portion 42 and the second height position of the fulcrum C2 of inclination of the housing portion 62. As a result, as compared with a configuration in which the third height position is closest to the reference plane, since the height required for the rear-surface-side cover 82 is reduced and the inclination range of the rear-surface-side cover 82 is reduced, the space required for opening the rear-surface-side cover 82 can be reduced.

(7) According to this embodiment, since the second support portion 52 is supported by the housing portion 62 and the rear-surface-side cover 82, as compared with a configuration in which the second support portion 52 is supported only by the housing portion 62, the deformation of the second support portion 52 when the paper sheet P is placed thereon can be suppressed.

Other Embodiments

Figure 16:
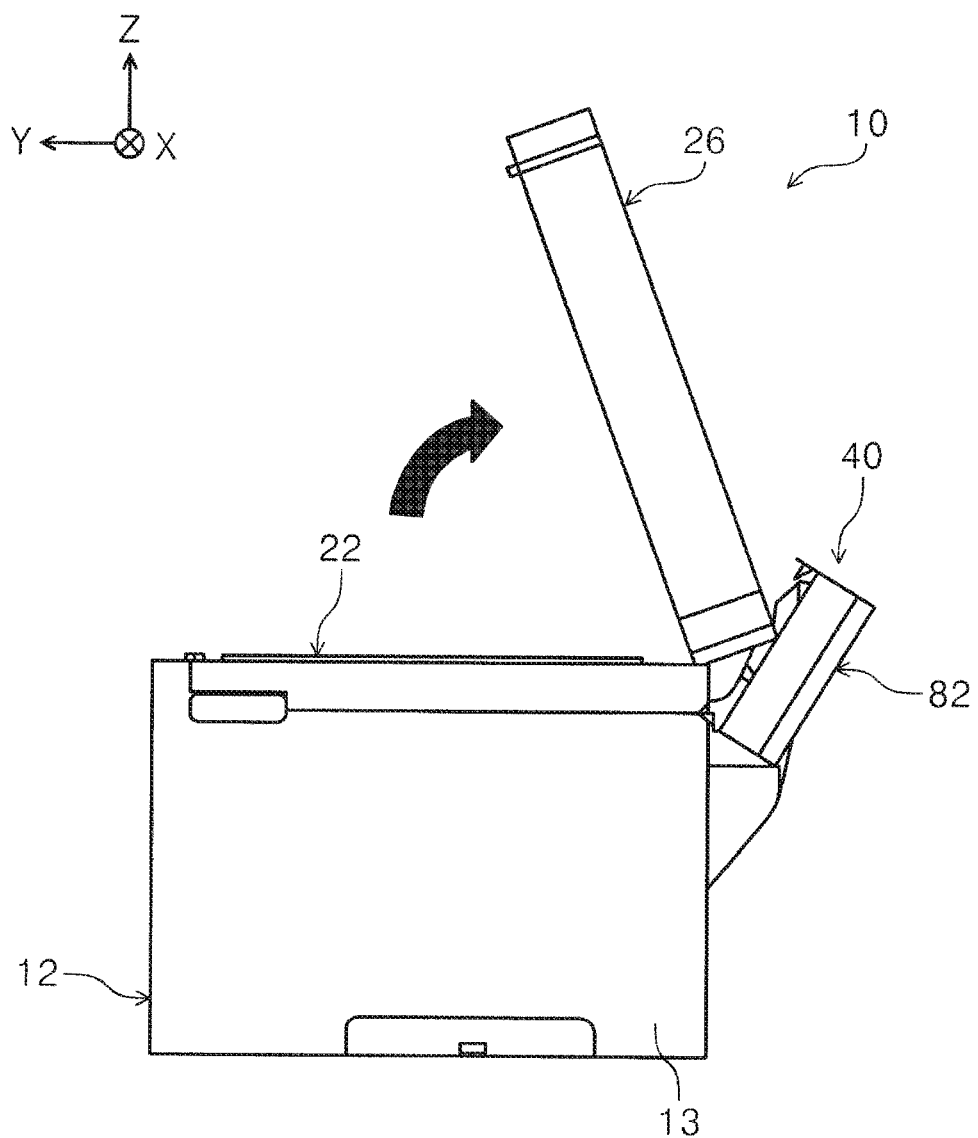
FIG. 16 is a side view illustrating an open state of an ADF unit according to the embodiment.

In the printer 10 illustrated in FIG. 16, the scanner unit 22 is exposed by lifting the +Y side of the ADF unit 26 to the +Z side with the hinge portion 28 (FIG. 2) as a fulcrum. That is, the scanner portion 20 takes an open state.

Figure 17:
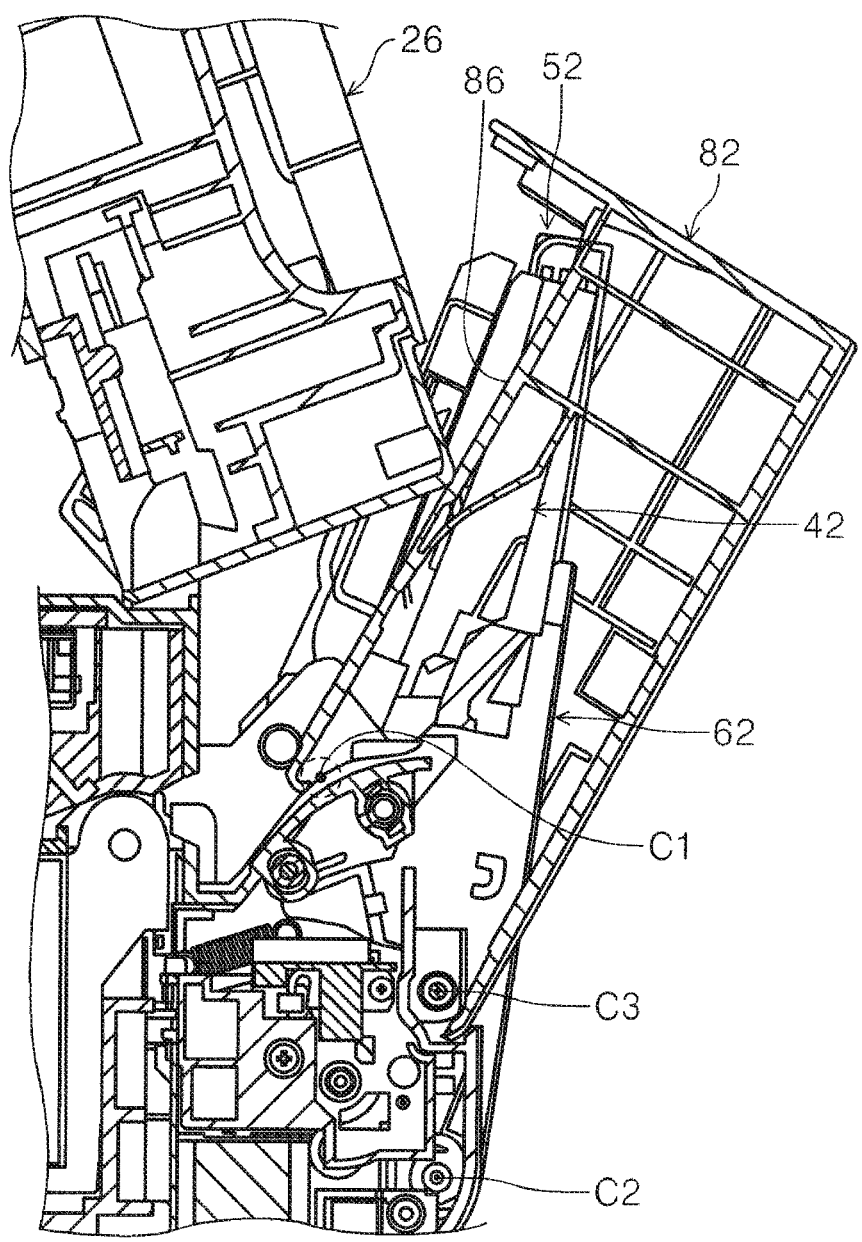
FIG. 17 is a side sectional view illustrating an internal configuration of the rear-surface-side paper feeding portion when the ADF unit according to the embodiment is in the open state.

At this time, as illustrated in FIG. 17, when both end portions of the ADF unit 26 in the X-axis direction come into contact with the front wall 86, the rear-surface-side cover 82 is inclined and takes the open state in which it is retracted to the −Y side. Here, since the fulcrum C3 of the rear-surface-side cover 82 is at a position different from the fulcrum C1 of the first support portion 42 and the fulcrum C2 of the housing portion 62, the rear-surface-side cover 82 can be retracted to the −Y side with respect to the first support portion 42 and the housing portion 62. Accordingly, it is possible to prevent the rear-surface-side cover 82 from interfering with the movement of the ADF unit 26 when the ADF unit 26 is lifted. In addition, the first support portion 42 and the second support portion 52 can be exposed without operating the rear-surface-side cover 82.

Figure 18:
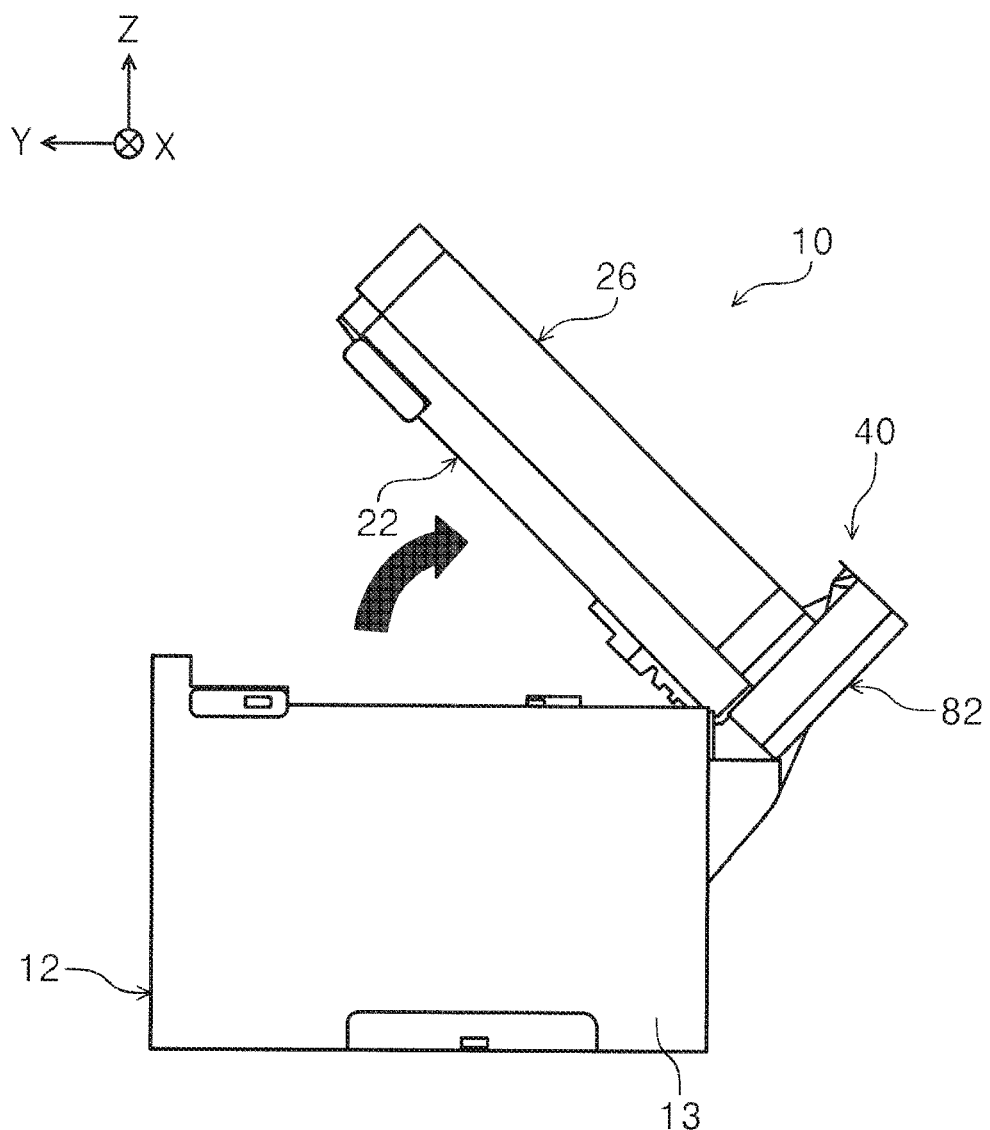
FIG. 18 is a side view illustrating when the ADF unit and a scanner unit according to the embodiment are in the open state.

Then, as illustrated in FIG. 18, when the +Y side of the scanner unit 22 is lifted to the +Z side with the hinge portion 24 (FIG. 2) as a fulcrum, the inside of the casing 13 is exposed and takes an open state. Here, since a −Y side end surface of the ADF unit 26 and a −Y side end surface of the scanner unit 22 are in contact with the front wall 86 (FIG. 17), the −Y side end portions of the ADF unit 26 and the scanner unit 22 can be covered with the rear-surface-side cover 82, and dust and the like can be suppressed from entering the casing 13.

The rear-surface-side paper feeding portion 40 and the printer 10 according to the embodiment of the present disclosure are basically based on having the above-described configurations; however, it is of course possible to partially change or omit a configuration without departing from the scope of the present disclosure.

The printer 10 is not limited to the ink jet type, but may be of an electrophotographic type.

The medium is not limited to the paper sheet P and may, for example, be a film.

The media supplying apparatus is not limited to being disposed on the rear surface side of the casing 13 like the rear-surface-side paper feeding portion 40, but may be disposed on the right side, left side, or front side of the casing 13. The holding portion 72 need not have the interlocking portion 76. That is, the first support portion 42 and the housing portion 62 may be separately held by different contact portions.

The guide groove 79 may be formed in the first support portion 42, and the guide pin 51 may be formed in the housing portion 62.

The contact portion 74 and the interlocking portion 76 may be disposed so as to be displaced in the X-axis direction.

The rear-surface-side paper feeding portion 40 need not be provided with the rear-surface-side cover 82. In addition, the rear-surface-side cover 82 need not have the front wall 86. That is, the inclination of the rear-surface-side cover 82 and the inclination of the first support portion 42 do not have to be linked.

The fulcrum C3 may be disposed at the same position as the fulcrum C1 or the fulcrum C2.

The rear-surface-side cover 82 need not support the second support portion 52.

The second support portion 52 may have the sub-support portion 58 and the main support portion 53 may support the paper sheet P.

What is claimed is:

1. A media supplying apparatus comprising:
    a first supporting portion that has a first supporting surface for supporting a medium, that is inclinably provided on an apparatus main body for supplying the medium, and that, when inclined from a non-use state, switches to a use state in which the first supporting surface supports the medium;
    a second supporting portion that has a second supporting surface for supporting the medium, and that is disposed upstream of the first supporting portion in the use state in a supply direction of the medium;
    a housing portion that is, inclinably toward an upstream of the first supporting portion in the supply direction, provided in the apparatus main body, and that retractably houses the second supporting portion; and
    a holding portion that holds the first supporting portion and the housing portion in an inclination orientation so that the first supporting surface and the second supporting surface are aligned in the supply direction.

2. The media supplying apparatus according to claim 1, wherein
    the holding portion includes
        a contact portion that is provided on the apparatus main body and that comes into contact with the first supporting portion in the use state and
        an interlocking portion that is provided in the first supporting portion and the housing portion and that interlocks inclination of the first supporting portion with inclination of the housing portion.

3. The media supplying apparatus according to claim 2, wherein
    the interlocking portion includes
        a groove portion that is formed on one of the first supporting portion and the housing portion and
        an insertion portion that is formed on an other of the first supporting portion and the housing portion and that is inserted into the groove portion.

4. The media supplying apparatus according to claim 2, wherein
    the contact portion and the interlocking portion are disposed at a same position in a width direction intersecting the supply direction.

5. The media supplying apparatus according to claim 1, further comprising:
    an opening/closing member that is openably/closably provided on the apparatus main body, that covers the first supporting portion, the second supporting portion, and the housing portion when in a closed state, and that inclines and exposes the first supporting portion and the housing portion when transitioning from the closed state to an open state.

6. The media supplying apparatus according to claim 5, wherein
    the opening/closing member is inclinably provided on the apparatus main body, and
    a third height position of a fulcrum of inclination of the opening/closing member in a height direction intersecting the supply direction of the apparatus main body is located between a first height position of a fulcrum of inclination of the first supporting portion and a second height position of a fulcrum of inclination of the housing portion.

7. The media supplying apparatus according to claim 5, wherein
    the opening/closing member, in an inclined state, supports the second supporting portion in the use state.

8. A recording apparatus comprising:
    the media supplying apparatus according to claim 5;
    a reading portion that is openably/closably provided on a recording apparatus main body, that reads information provided on the medium when in a closed state, and that, in an open state, comes into contact with the opening/closing member and puts the opening/closing member in the open state; and
    a recording portion that records, based on received information, on the medium, information.

9. A recording apparatus comprising:
    the media supplying apparatus according to claim 1; and
    a recording portion that records, based on received information, on the medium, information.

* * * * *